United States Patent [19]
Walker et al.

[11] Patent Number: 5,897,620
[45] Date of Patent: Apr. 27, 1999

[54] METHOD AND APPARATUS FOR THE SALE OF AIRLINE-SPECIFIED FLIGHT TICKETS

[75] Inventors: Jay S. Walker, Ridgefield; Thomas M. Sparico, Riverside; T. Scott Case, Darien, all of Conn.

[73] Assignee: priceline.com Inc., Stamford, Conn.

[21] Appl. No.: 08/889,304

[22] Filed: Jul. 8, 1997

[51] Int. Cl.⁶ .................................................. G06F 17/60
[52] U.S. Cl. .................................................. 705/5; 705/6
[58] Field of Search .................................. 705/5, 6, 7, 9, 705/28; 707/1, 2, 3, 102, 104

[56] References Cited

U.S. PATENT DOCUMENTS

| | | | |
|---|---|---|---|
| 4,775,936 | 10/1988 | Jung ............................................. | 705/5 |
| 4,845,625 | 7/1989 | Stannard ...................................... | 705/5 |
| 4,931,932 | 6/1990 | Dalnekoff et al. ........................... | 705/5 |
| 5,237,499 | 8/1993 | Garback ....................................... | 705/5 |
| 5,253,165 | 10/1993 | Leiseca et al. ............................... | 705/5 |
| 5,270,921 | 12/1993 | Hornick ....................................... | 705/6 |
| 5,331,546 | 7/1994 | Webber et al. ............................... | 705/6 |
| 5,483,444 | 1/1996 | Heintzeman et al. ....................... | 705/5 |
| 5,570,283 | 10/1996 | Shoolery et al. ............................. | 705/5 |
| 5,797,127 | 8/1998 | Walker et al. ............................... | 705/5 |

OTHER PUBLICATIONS

Richard Carroll, *Hitch a Flight to Europe*, p. 1, <http//travelassist.com/mag/a69.html>. not dated.
*Airhitch Your Way To Low Cost Travel*, pp. 1, 2, <http://www.vaportrails.com/Budget/BudFeatures/Airhitch/Airhitch.html>. not dated.
Sue Goldstein, Airhitch, p. 1. not dated.
Miles Poindexter, *Airhitch: Myth or Fact*, pp. 1, 2. not dated.
*Frequently Asked Questions about Airhitch*, pp. 1–5, 1995, <http://www.isicom.fr/airhitch/ahfaq>.
*Across the Atlantic Anytime for $169!!!*, pp. 1, 2, <http://www.isicom.fr/airhitch/index.html>. not dated.
*Airhitch, General Information, New!!! Target Flights Update*, pp. 1–6, <http://www.isicom.fr/airhitch/info.htm>. not dated

*Target Flight(R) Quote Request Form*, pp. 1, 2, <http://www.isicom.fr/airhitch/tf_qrf.txt>. not dated.

*Working For/With Airhitch*, pp. 1–5, <http://www.isicom.fr/airhitch/jobs.htm>. not dated.

(List continued on next page.)

*Primary Examiner*—Stephen R. Tkacs
*Attorney, Agent, or Firm*—Morgan & Finnegan LLP; Jeffrey L. Brandt

[57] ABSTRACT

An unspecified-time airline ticket representing a purchased seat on a flight to be selected later, by the airlines, for a traveler-specified itinerary (e.g., NY to LA on March 3rd) is disclosed. Various methods and systems for matching an unspecified-time ticket with a flight are also disclosed. An exemplary method includes: (1) making available an unspecified-time ticket; (2) examining a plurality of flights which would fulfill the terms of the unspecified-time ticket to determine which flight to select; and (3) providing notification of the selected flight prior to departure. The disclosed embodiments provide travelers with reduced airfare in return for flight-time flexibility and, in turn, permits airlines to fill seats that would have otherwise gone unbooked. Because of the flexibilities required of the unspecified-time traveler, unspecified-time tickets are likely to attract leisure travelers unwilling to purchase tickets at the available published fares and, at the same time, are likely to "fence out" business travelers unwilling to risk losing a full day at either end of their trip. Moreover, the flexibilities required of the unspecified-time traveler need not be limited to a departure time; the flexibilities may also include the airline, the departing airport, the destination airport, or any other restriction that increases the flexibility afforded the airline in placing the traveler aboard a flight. The disclosed embodiments thus permit airlines to fill otherwise empty seats in a manner that stimulates latent and unfulfilled leisure travel demand while leaving their underlying fare structures intact.

101 Claims, 20 Drawing Sheets

OTHER PUBLICATIONS

*Marketel says it plans to launch air fare "auction" in June: Marketel Int'l Inc.,* Travel Weekly, vol. 50, No. 34, p. 1, Apr. 29, 1991.

*Ticketing Revolution Could Triple Airline Profits, Analyst Says,* Aviation Daily, vol. 325, No. 11, p. 87, Jul. 17, 1996.

*Cathay Pacific to Auction Off Airline Tickets on the Internet,* The San Francisco Chronicle, Business, p. C4, Apr. 30, 1996.

*Going Once, Going Twice, Going Online,* The San Francisco Chronicle, Business, p. B1, Nov. 13, 1995.

*Auctioning Unsold Airline Tickets,* <http://www.newciv.org/GIB/BOV/BV-409.HTML>. not dated.

*Ticket–Bidding Firm Closes Its Doors; Marketel Int'l,* Travel Weekly, vol. 51, No. 21, p. 1, Mar. 12, 1992.

*Travelers Bidding On Airline Tickets—SF Firm Offers Chance for Cut/Rate Fares,* The San Francisco Chronicle, News, p. A4, Aug. 19, 1991.

*An Experiment In Economic Theory: Labs Testing Real Markets,* The Record, Business, p. B01, Nov. 26, 1989.

*AAL's Riga Doubts Marketel's Appeal to Retailers; Chris Riga of American Airlines,* Travel Weekly, vol. 48, No. 91, p. 4, Nov. 13, 1989.

*Computers May Turn the World Into One Big Commodities Pit,* Business Week, Economic ViewPoint, No. 3123, p. 17, Sep. 11, 1989.

"Northeastern International Airways Offers a $79 One–way Low Fare Between Florida and New York"; *PR Newswire;* FLPR3; Sep. 11, 1984; Dialog: File 148, Acc# 02199728.

Greene; "Student Standby Fares Now a Flight of Fancy"; *Chicago Tribune;* Nov. 20, 1985; Dialog: File 632, Acc# 01076578.

Shea; "Despite Hitches, Airhitch Offers Rock–bottom Flights"; *San Jose Mercury News;* Mar. 22, 1992; Dialog: File 634, Acc# 06582190.

Miskin; "On the Go"; *Newsday;* Jul. 10, 1994; Dialog: File 638, Acc# 07691008.

FORECASTED DEMAND ANALYSIS DATABASE 230

| FLIGHT NUMBER 605 | DEPARTURE DATE 610 | ORIGINATING CITY 615 | DESTINATION CITY 620 | PRICE 625 | CLASS 630 | ACTUAL QUANTITY BOOKED 640 | EXPECTED QUANTITY BOOKED 650 |
|---|---|---|---|---|---|---|---|
| 1234 | 3/3/97 | NEW YORK (JFK) | LOS ANGELES (LAX) | $349 | Y | 40 | 70 |
| 1234 | 3/3/97 | NEW YORK (JFK) | LOS ANGELES (LAX) | $339 | Y | 65 | 90 |
| 1234 | 3/3/97 | NEW YORK (JFK) | LOS ANGELES (LAX) | $329 | Y | 95 | 125 |
| 1234 | 3/3/97 | NEW YORK (JFK) | LOS ANGELES (LAX) | $409 | K | 7 | 20 |
| 1234 | 3/3/97 | NEW YORK (JFK) | LOS ANGELES (LAX) | $399 | K | 40 | 60 |

FIG. 6

FLIGHT SCHEDULE DATABASE 240

| ORIGINATING AIRPORT 705 | DESTINATION AIRPORT 710 | DATE 715 | TIME OF DEPARTURE 720 | TIME OF ARRIVAL 725 | AIRLINE 730 | FLIGHT NUMBER 735 | VIA 740 |
|---|---|---|---|---|---|---|---|
| NEW YORK (JFK) | LOS ANGELES (LAX) | 3/3/97 | 9:00 AM EST | 11:00 AM PST | AA | 1234 | NON STOP |
| NEW YORK (JFK) | LOS ANGELES (LAX) | 3/3/97 | 10:30 AM EST | 12:30 PM PST | AA | 4567 | ONE-STOP |
| NEW YORK (JFK) | LOS ANGELES (LAX) | 3/3/97 | 1:30 PM EST | 7:00 PM PST | AA | 2345 | NON STOP |
| NEW YORK (JFK) | LOS ANGELES (LAX) | 3/3/97 | | | AA | A3467 | |
| NEW YORK (JFK) | LOS ANGELES (LAX) | 3/3/97 | 4:00 PM EST | 6:30 PM PST | AA | 9876 | NON STOP |
| NEW YORK (JFK) | LOS ANGELES (LAX) | 3/3/97 | | | UNITED | A4237 | |

FIG. 7

SEAT ALLOCATION DATABASE 245

| FLIGHT NUMBER 805 | DEPARTURE DATE 810 | REMAINING INVENTORY K SEATS 815 | REMAINING INVENTORY Y SEATS 820 | TOTAL INVENTORY BOOKED 825 |
|---|---|---|---|---|
| 1234 | 3/3/97 | 33 | 20 | 247 |
| 4567 | 3/3/97 | 50 | 10 | 240 |
| 2345 | 3/3/97 | 5 | 5 | 290 |
| 9876 | 3/3/97 | 47 | 53 | 200 |
| A3467 | 3/3/97 | 10 | 10 | 20 |

FIG. 8

PRICING AND RESTRICTIONS
DATABASE 250

| FLIGHT NUMBER 905 | DATE 910 | INVENTORY K PRICE 915 | INVENTORY K RESTRICTION 920 | INVENTORY Y PRICE 925 | INVENTORY Y RESTRICTION 930 |
|---|---|---|---|---|---|
| 1234 | 3/3/97 | $399 | NON STOP | $339 | NON STOP |
| 4567 | 3/3/97 | $329 | ONE STOP | $369 | ONE STOP |
| A3467 | 3/3/97 | $209 | ONE STOP | $209 | ONE STOP |

| FLIGHT NUMBER 1005 | ORIGINATING AIRPORT/ DESTINATION AIRPORT 1010 | CARRIER 1015 | CLASS 1020 | PRICE 1025 | PASSENGER NAME RECORD 1030 |
|---|---|---|---|---|---|
| 1234 | (JFK) - (LAX) | AMERICAN | K | $399 | XXXXX |
| A3467 | (JFK) - (LAX) | AMERICAN | N/A | $209 | XXXXX |

RESERVATION DATABASE 255

FIG. 10

METHOD AND APPARATUS FOR THE SALE OF AIRLINE-SPECIFIED FLIGHT TICKETS

TECHNICAL FIELD

This invention relates generally to a method and system for selling airline tickets.

BACKGROUND

Airlines have developed Revenue Management Systems (RMS) to optimize their revenue per flight. Revenue management can be separated into two distinct parts: pricing and seat inventory control. Pricing involves the establishment of fare classes and tariffs within those classes for each flight. Seat inventory control is the periodic adjustment of available seats for the various fare classes so as to optimize the passenger mix and thereby maximize the generated revenue. In particular, the objective is to fly an aircraft as full as possible without allowing the earlier-booking (discount-fare) leisure passengers to displace the later-booking (full-fare) business passengers.

Presently, tickets offered for sale by the airlines specify information including an itinerary (e.g., origin/destination locations and dates for travel) together with a flight number and a flight time. Once a passenger books a ticket, the airline is required to place the passenger aboard the flight indicated on the ticket rather than aboard a different flight for the same itinerary. In particular, once a ticket is booked, an airline has little or no flexibility in placing a discount-fare traveler aboard a later flight for the same itinerary in order to make available a seat for a full-fare business traveler. Even tour packages, once completed, do not provide the airlines with any flight-time flexibility.

Moreover, an airline's RMS typically knows well in advance, based on available historical data, that it will have empty seats on a given route (whether or not it will actually have empty seats on a given flight)—with more seats empty at certain times of the day or days of the week. However, the RMS cannot simply discount the published fares for those seats without either starting a fare war or compromising its underlying fare structure (i.e., without also having to reduce its full-fare prices for business travelers).

Placing a passenger on "standby" is one way for the airlines to fill empty seats. However, this practice is limited to instances where some oversight on the part of either the passenger or the airline has occurred and the passenger is now attempting to get aboard the next available flight. For example, the passenger may have arrived too late and missed his flight, or the passenger may have purchased a ticket at or near the time of the flight. However, the airlines generally do not use standby because of the high costs associated therewith. Moreover, standby is inconvenient for the passenger because there is no guarantee that he will get a seat on a flight departing that same day.

"Open" tickets are known in the field of airline travel where a passenger buys a ticket that can be used for any flight having an available seat. Open tickets, however, are utilized for flights selected by passengers. Open tickets thus do not solve the problem of how to fill available airline seats for the highest revenue and/or without undermining established fare structures.

Tour packages are known wherein a traveler initially receives a travel intinerary as part of a tour package purchase, and subsequently receives a ticket including notification of the flight number and time. In such tour packages, a tour operator is typically involved in purchasing groups of tickets. Again, while tour packages provide the operators with some flexibility in obtaining group rates for tickets, they do not solve the airline's problems of profitability filling empty seats.

Travel on military flights is typically according to orders, which gives the military operators absolute control over their flights. However, military flights are typically not paid for, and hence the military does not face the problem of revenue managing their seat allocation which is so problematic for commercial airlines.

Furthermore, although various "businesses" have existed and continue to exist which collect consumer demand for airline tickets and then manually interact with the airlines by way of phone or fax to purchase airline tickets for their clients at a reduced fare, these services are not truly automated in that they do not operate within the framework of the existing central reservation systems (CRSs), through which all airlines offer tickets for sale and all travel agents book such tickets.

As such, there is currently no way for the airlines to routinely fill excess capacity without undermining their underlying fare structures.

SUMMARY OF INVENTION

One object of the present invention is to provide a system and method whereby a airline may create and sell unspecified-time airline tickets corresponding to special fare listings, wherein a commitment for carriage, may be purchased without a specified departure time.

In accordance with one aspect of the invention, there is provided a system and method for viewing special fare listing information for air travel to a specified destination location from a specified departure location within a specified time range, the special fare listing information excluding a specified departure time; transmitting a request to purchase a commitment for carriage corresponding to the special fare listing information; receiving a commitment for carriage, including an obligation by an airline to provide a seat on a flight, that satisfies the request but does not specify a departure time; accepting the commitment for carriage; and receiving at a time subsequent to the accepting an identification of the departure time.

In accordance with another aspect of the invention, there is provided a system and method for receiving a request to purchase a ticket to travel from a specified departure location to a specified destination location within a specified time range; querying a central reservation system to determine a special fare listing that satisfies the request but does not specify a departure time; receiving the special fare listing; booking a ticket relating to the special fare listing; receiving at a time subsequent to the commitment an identification of the departure time; and initiating a notice of the departure time.

In accordance with yet another aspect of the invention, there is provided a system and method for creating a special fare listing for air travel to a specified destination location from a specified departure location within a specified time range, the special fare listing excluding a specified departure time; outputting the special fare listing via an electronic reservation system; examining a plurality of flights which would fulfill the specified terms of a ticket relating to the special fare listing to determine which of the plurality of flights to select for the ticket, each of the plurality of flights including a specified departure time; selecting one of the plurality of flights; and outputting notification of flight information, including a specified departure time, corresponding to the selected flight.

In accordance with another aspect of the invention, there is provided a system and method for receiving a special fare listing for air travel to a specified destination location from a specified departure location within a specified time range, the special fare listing excluding a specified departure time; transmitting the special fare listing to a buyer; receiving a booking of a ticket corresponding to the special fare listing from the buyer; transmitting the booking information to an airline; and receiving an identification of a flight selected by the airline which fulfills the terms of the ticket, the selected flight including a specified departure time, In accordance with yet another aspect of the invention, there is provided a system and method for receiving a booking of an unspecified-time ticket to a specified destination location from a specified departure location within a specified time range, the unspecified-time ticket excluding a specified departure time; examining a plurality of flights which would satisfy the specified terns of the unspecified-time ticket to determine which of the plurality of flights to select for the unspecified-time ticket; selecting one of the plurality of flights; and outputting notice of the selected flight, wherein the selected flight includes a specified departure time.

Thus, one embodiment of the present invention provides airlines with the flight-time flexibility necessary to fill potentially thousands of seats that would otherwise have remained empty each day. Airlines benefit from the additional flexibility of being able to balance intra-day demand by placing unspecified-time ticket holders aboard "low load" flights on a given day. Moreover, because of the flexibilities required of the unspecified-time traveler, unspecified-time tickets (and the reduced airfares associated therewith) are likely to attract leisure travelers unwilling to purchase tickets at the available published fares and, at the same time, are likely to "fence out" business travelers unwilling to risk losing the major part of the work day at either end of their trips due to the uncertainty of the exact times of the flight they might be placed on.

Moreover, the flexibilities required of the unspecified-time traveler need not be limited to a departure time. Rather, the flexibilities may include the airline, the departing airport, the destination airport, or any other restriction that increases the flexibility afforded the airline in placing the traveler aboard a flight. The present invention therefore permits airlines to fill otherwise empty seats in a manner that stimulates latent and unfulfilled leisure travel demand while leaving their underlying fare structures intact.

A system and method is also disclosed for providing a concealed carrier airline ticket, which permits an airline to conceal its identity when offering for sale through a CRS discounted tickets for flights on a specific route on a specific day.

A method according to this alternate embodiment includes: (1) creating an alias flight record based on an actual flight, the alias flight record excluding a carrier name; and (2) making available the alias flight record for electronic posting in a CRS.

Further aspects of the present invention will become apparent during the course of the following description and by reference to the attached drawings.

BRIEF DESCRIPTION OF THE DRAWINGS

FIG. 6 illustrates an exemplary forecasted demand analysis database.

FIG. 7 illustrates an exemplary flight schedule database.

FIG. 8 illustrates an exemplary seat allocation database.

FIG. 10 illustrates an exemplary reservation database.

DETAILED DESCRIPTION

Figure 1:
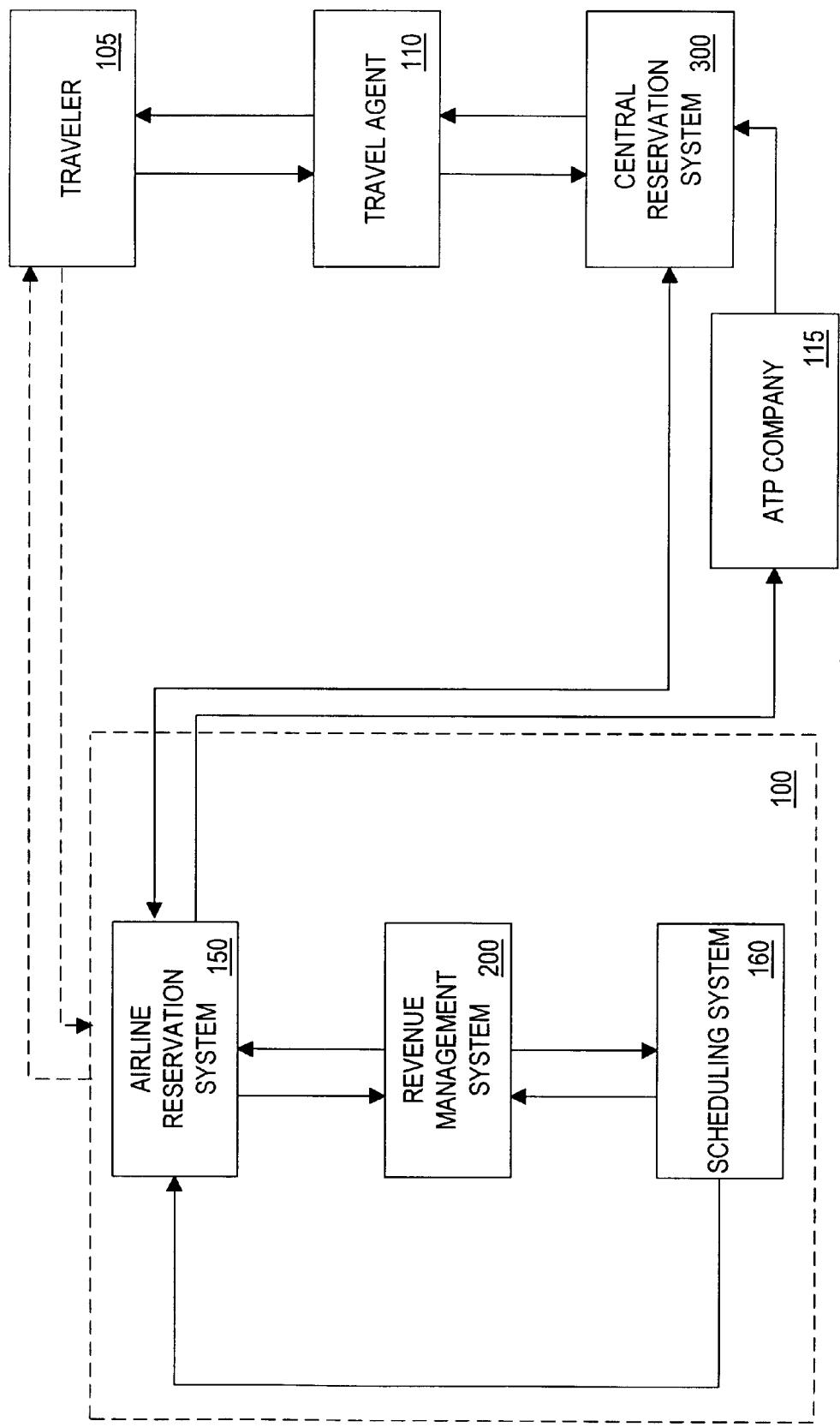
FIG. 1 is a block diagram illustrating one embodiment of the present invention.

Referring now to the drawings, FIG. 1 illustrates one embodiment of the present invention.

As shown in FIG. 1, an airline's 100 revenue management system (RMS) 200 analyzes historical demand and pricing data for previous flights along a specific route (e.g., NY-LA) during the relevant time period to determine the number of actual flights to offer for a specific route on a specific day. Once this determination is made, the RMS 200 instructs the airline scheduling system 160 to create the actual flights. The RMS 200 also instructs the airline scheduling system 160 to create a special fare listing for the same route on the same day. The term "special fare listing" as used herein is as a listing in an Airline Reservation System 150 (ARS), CRS 300 or the like for which a traveler 105 may purchase an "unspecified-time" ticket. The "unspecified-time ticket", in accordance with the present invention, is an official airline ticket that represents a seat on an actual flight to be determined later, by the airline 100, for a traveler-specified itinerary including the origin and destination locations together with the travel dates. The airline scheduling system 160 creates both the actual flights and the special fare listing, as instructed, and transmits the scheduling information to the ARS 150.

The RMS 200 also establishes a plurality of fare classes for the actual flights, utilizes historical data to forecast an expected demand over time (i.e., a demand curve) for tickets within a given fare class at a given price, and initially allocates and prices inventory sufficient to satisfy the expected demand. The RMS 200 transmits this inventory and pricing information to the ARS 150.

The RMS 200 also initially allocates inventory to the special fare listing corresponding to seats on the actual flights for the same route and day, which are forecasted to be empty at the time of departure. As is well-known in the art, the RMS 200 can predict, based on available historical data, whether it will have empty seats on a given route. Moreover, the inventory initially allocated to the special fare listing is preferably offered at a lower fare/class than the available fare/class on the actual flights to encourage sales of unspecified-time tickets. In this regard, fare discounts associated with the special fare listing are preferably commensurate with the degree of flexibility afforded the airline in placing the traveler aboard an actual flight. For example, the wider the "window of departure" (e.g., 8 AM to 8 PM) associated with the special fare listing, the greater the discount. Conversely, the narrower the window, the smaller the discount.

For the actual flights, the RMS 200 will monitor the actual demand within each fare class relative to the forecasted demand to dynamically reevaluate the inventory allocated to both the actual flights and the special fare listing. In accordance with the present invention, if the actual demand is less than the expected demand, the RMS 200 will allocate additional inventory to the special fare listing at a lower fare/class than the currently available fare/class on the actual flights. Conversely, if the actual demand is greater than the expected demand, the RMS 200 will reduce or eliminate inventory for the special fare listing. In either case, the RMS 200 transmits inventory and pricing information for the special fare listing to the ARS 150 in the same manner as for the actual flights.

The inventory and pricing information for both the special fare listing and the actual flights is transmitted by the ARS 150 to the CRS 300, either directly or, via the Airline Tariff Publishing Company (ATP Co.) 115. As such, in the embodiment shown in FIG. 1, the unspecified-time tickets are made available to travel agents 110 and their customers 105 through the CRS 300. The present invention thus minimizes investment in specialized systems since it is operable using a conventional CRS. Examples of such a CRS are known under the trade names Apollo, Sabre, System One and the like. Alternatively, the traveler 105 can purchase an unspecified-time ticket directly from the airline 100. However, purchasing an unspecified-time ticket through a travel agent, rather than directly from the airline, has many advantages. For example, purchasing an unspecified-time ticket through a travel agent provides the traveler with flexibility in choosing an airline and thus, permits the traveler to "shop around" for the best fares on unspecified-time tickets.

As shown in FIG. 1, a traveler 105 contacts his travel agent 110 by way of phone, fax, online connection, e-mail or in-person, and provides the travel agent 110 with information regarding a specific itinerary. An itinerary includes the origin and destination locations together with the travel dates. The travel agent 110 then logs into the CRS 300 and obtains flight records for all flights that satisfy the requested itinerary. One of the flight records may be designated a "special fare listing" indicating that a traveler can purchase an unspecified-time ticket for a flight that satisfies the requested itinerary, although the actual flight itself and thus, the flight time, has not yet been determined by the airline. In any event, the unspecified-time ticket represents a commitment for carriage (i.e., an obligation by the airline to provide a seat on a flight) for the requested itinerary.

The travel agent 110 would then discuss the benefits of booking an unspecifiedtime ticket for a special fare listing with the traveler 105. One example of such benefits includes reduced airfare as compared with conventional airline tickets. If instructed by the traveler 105 and, if there is available inventory for the special fare listing, the travel agent 110 will book the unspecified-time ticket through the CRS 300 and create a passenger name record (PNR) number. Upon purchasing the unspecified-time ticket, the traveler 105 is provided with a special fare listing number and a notification date, by which date the traveler 105 will be provided with the actual flight number and a departure time.

The CRS 300 transmits in real-time, or on a periodic basis, as determined by the airline 100, information regarding unspecified-time tickets booked for each airline to that airline's ARS 150, which then forwards this information to the RMS 200. For each booking, the RMS 200 will obtain a listing of all actual flights that satisfy the travel parameters (i.e., O/D pair and date) of the unspecified-time ticket. The RMS 200 then analyzes the expected vs. the actual demand for each class on each actual flight and determines whether the actual demand is less than the expected demand for tickets for one or more of the actual flights. To narrow any discrepancy, the RMS 200 instructs the ARS 150 to place a passenger from a special fare listing onto an actual flight. In the case where bookings are transmitted to the CRS 300 in real-time, the travel agent notifies the passenger of the actual flight information in real-time (within seconds or minutes after transmission of the booking) or, alternatively, by a notification date, as will be discussed in detail hereinafter. The airline 100 prints the ticket for the actual flight with the actual flight number and the departure/arrival times and, transmits the ticket to the traveler 105, either directly or via the travel agent 110, depending upon whether the traveler 105 purchased the unspecified-time ticket through a travel agent 110 or directly from the airline 100.

Moreover, the flight record for a special fare listing, in addition to not specifying an actual flight number and departure time, may also not specify a ticket price. In this embodiment, the airline 100 effectively solicits travelers 105 to submit bids for the unspecified-time tickets in the manner discussed in co-pending U.S. patent application Ser. No. 08/707,660, filed Sep. 4, 1996, and entitled, "Method and Apparatus for a Cryptographically Assisted Commercial Network System Designed to Facilitate Buyer-Driven Conditional Purchase Offers" and in a U.S. Patent Application entitled, "Conditional Purchase Offer Management" filed concurrently herewith, both of which are incorporated herein by reference. For example, a bid so submitted may specify that the traveler 105 wants to purchase an unspecified-time ticket for a specific itinerary, and that the traveler is willing to pay $375 for the ticket. Moreover, the airline 100 may require that payment be guaranteed (e.g., by supplying a credit card number with a bid) upon acceptance by the airline.

The traveler 105 could submit a bid to the airline 100 in any number of ways. For example, a bid could be submitted via an online direct connection. The travel agent 110 could also submit a bid on behalf of the traveler 105 using the e-mail capabilities of the CRS 300. Alternatively, the traveler 105 could submit a bid via an Interactive Voice Response Unit (IVRU) (not shown) coupled to the airline's RMS 120. In either case, an airline will be able to fill excess seating capacity without lowering its published fares and thus, without initiating a fare war.

The RMS 200 would render a decision to either accept or reject the bid based on the inventory and pricing guidelines in the RMS 200. The traveler 105 would be notified of the RMS's decision via the IVRU or a live operator. Also, if the bid were accepted by the RMS 200, the RMS 200 would then select an actual flight to place the unspecified-time traveler 105 aboard, as described above, and the traveler 105 would be notified of the actual flight number and flight time accordingly.

Moreover, although the foregoing illustrates unspecified-time tickets offered by an individual airline, a "generic" unspecified-time ticket may also be offered, which, in addition to not it specifying a flight number and flight time, would also not specify an airline. The "generic" unspecified-time ticket, like the airline-specific unspecified-time ticket, would be assigned a special fare listing number. As such, any airline offering actual flights that satisfy the travel parameters of the generic unspecified-time ticket and seeking to fill excess seating capacity could then query the CRS for bookings of generic unspecified-time tickets and place the traveler aboard one of its flights.

Figure 2:
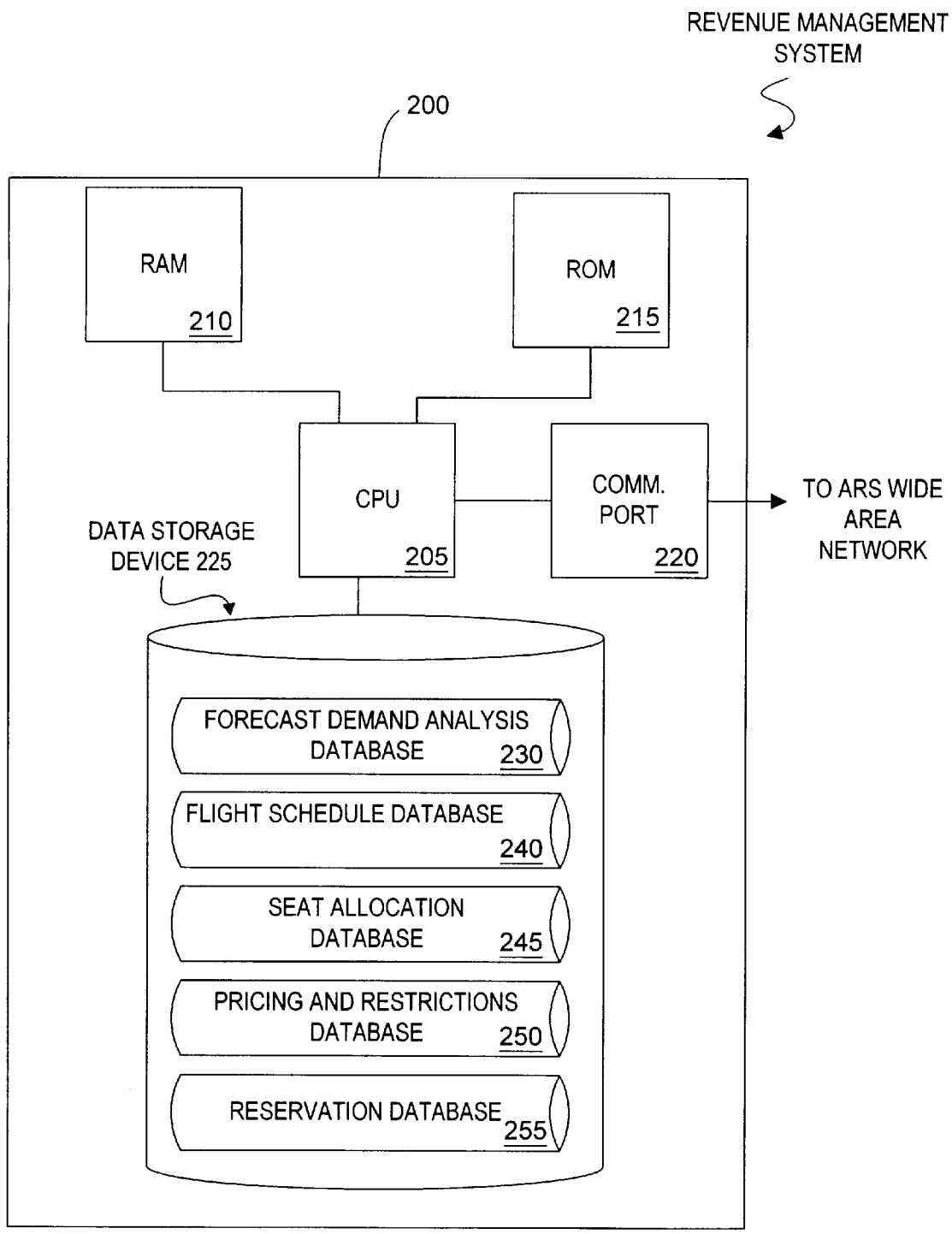
FIG. 2 depicts a block diagram of an exemplary revenue management system (RMS).

FIG. 2 depicts a block diagram of an exemplary RMS 200 maintained by airline 100. The RMS 200 performs all the operations of a conventional RMS, and, performs additional operations in accordance with the present invention, as will be discussed in detail hereinafter. The RMS 200 includes a CPU 205 together with associated memory (210, 215) for: (1) creating both actual and special fare listings; (2) allocating inventory and fare/class to those flights; and (3) selecting an actual flight on which to place unspecified-time ticket holders, as will be discussed in detail hereinafter. The CPU 205 is coupled to an airline reservation system (ARS) via a communications port 220 for obtaining unspecified-time bookings from the ARS. As shown in FIG. 2, the CPU 205 is also coupled to a data storage device 225.

Data storage device 225 includes a variety of databases including a forecasted demand analysis database 230, a flight schedule database 240, a seat allocation database 245, a pricing and restrictions database 250, and a reservation database 255.

The flight schedule database 240 of data storage device 225 contains flight information including the origin and destination locations together with a departure date. The flight information also includes an actual flight number and the flight times, except in the case of a special fare listing. The seat allocation database 245 contains available inventory for each fare class on a given flight. The pricing and restrictions database 250 contains pricing information and related restrictions for each fare class on a given flight. The reservation database 255 contains each booking of a ticket for a given fare class on a given flight. Finally, the forecasted demand analysis database 230 contains information on each selling price for each fare class for a given flight, and the forecasted demand at each selling price, as established by the RMS 200. Each of these databases will be discussed in detail hereinafter in conjunction with FIGS. 6–10.

Figure 3:
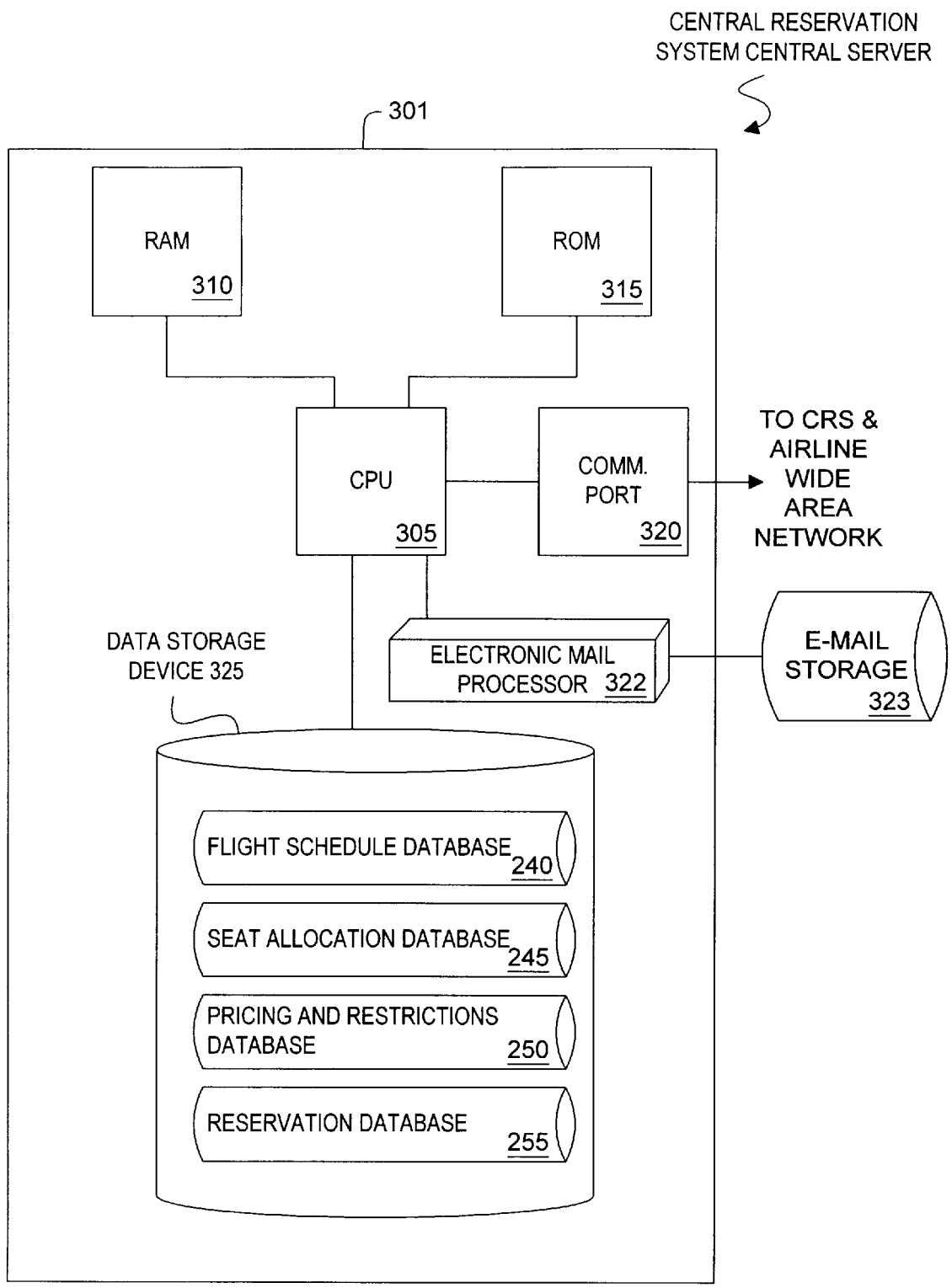
FIG. 3 depicts a block diagram of an exemplary central reservation system (CRS).

FIG. 3 depicts a block diagram of an exemplary central server 301 of a central reservation system 300. The CRS 300 performs all the operations of a conventional CRS and, performs additional operations in accordance with the present invention, as will be discussed in detail hereinafter. The server 301 includes a CPU 305 together with associated memory (310, 315) for processing: (1) flight information received from the airlines; (2) itinerary inquiries regarding flight availability; and (3) ticket bookings. The CPU 305 is coupled to the CRS 300 and the airlines 100 via a communications port 320. The CPU 305 is also coupled to an electronic mail processor 322 for processing and storing (in storage device 323) e-mail messages transmitted between the CPU 305 and the various travel agents, airlines and the like.

As shown in FIG. 3, the CPU 305 is further coupled to a data storage device 325. Data storage device 325 may include a variety of databases including flight schedule database 240, seat allocation database 245, pricing and restrictions database 250, and reservation database 255. These databases contain essentially the same information as the like-identified databases (240, 245, 250, 255) in the RMS 200.

Figure 4:
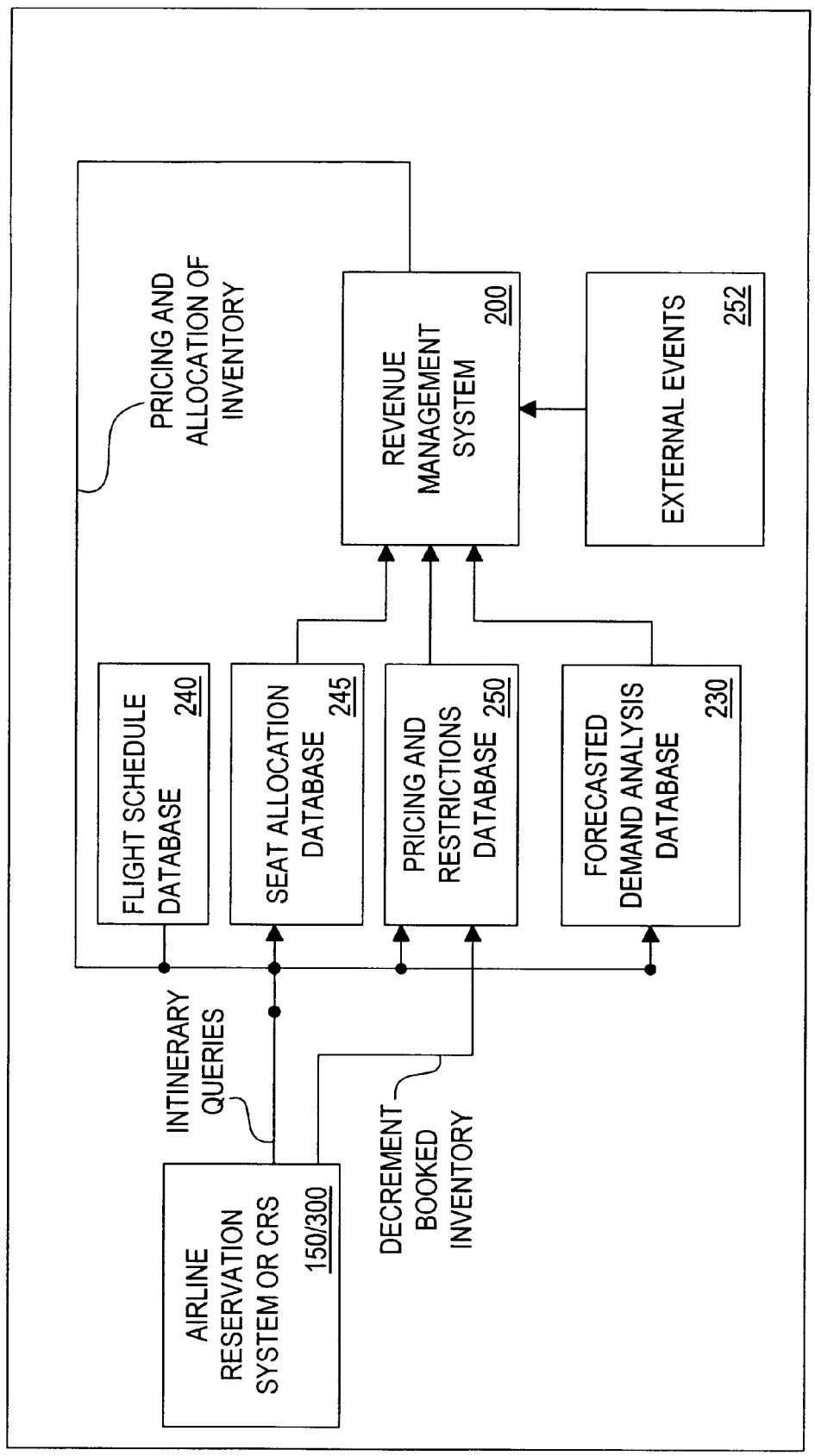
FIG. 4 illustrates the interaction between the RMS, the CRS, the airline reservation system (ARS) and the various databases depicted in FIGS. 2 and 3.

FIG. 4 illustrates the manner in which the RMS 200 utilizes the databases discussed in connection with FIG. 2 in implementing a pricing and inventory allocation process with respect to both actual flights and special fare listings. The format and content of the databases depicted in FIG. 4 are discussed in detail hereinafter in conjunction with FIGS. 6–10. It is to be noted that the pricing and inventory allocation process may be executed by the RMS 200 initially when a flight is first added to the flight schedule and thereafter periodically to reallocate and price available inventory in response to demand and external events.

When either an actual flight or special fare listing is first added to the flight schedule of an airline 100, a record of the flight with the appropriate itinerary information is created by the RMS 200 in the flight schedule database 240. In addition, the RMS 200 will perform inventory allocation and pricing for both actual flights and special fare listings, to initially populate the fields of the seat allocation database 245, pricing and restrictions database 250 and forecasted demand analysis database, as shown in FIG. 4.

Generally, during the initial pricing and allocation process for an actual flight, the RMS 200 attempts to maximize revenue by first establishing a plurality of fare classes and thereafter allocating the number of seats and price assigned to each fare class. To this end, the RMS 200 will utilize historical demand information stored in the forecasted demand analysis database 230 for prior periods, which essentially provides a demand curve for each selling price of a given fare class on each actual flight. For example, when allocating and pricing inventory for an actual flight, the RMS 200 may analyze demand trends for similar flights from previous relevant time periods, in a known manner. Moreover, it is to be understood that conventional RMS systems typically respond to competitive forces and other external events, such as fare wars or increased demand due to a large event, such as the Olympics, as indicated by the external events database 252, depicted in FIG. 4. Once calculated, the initial seat allocation and pricing information is stored in the seat allocation database 245 and the pricing and restrictions database 250, respectively. The initial price for each fare class and the forecasted demand is also preferably stored in the forecasted demand analysis database 230.

In accordance with the present invention, the RMS 200 also initially allocates inventory to the special fare listing corresponding to seats on the actual flights for the same route and day, which are forecasted to be empty at the time of departure. The RMS 200 can predict, based on available historical data, whether it will have empty seats on a given route (whether or not it will actually have empty seats on a given flight)—with more seats empty at certain times of the day or weeks of the year. Moreover, the inventory initially allocated to the special fare listing is offered at a lower fare/class than the currently available fare/class on the actual flights to encourage sales of unspecified-time tickets.

As shown in FIG. 4, the airline reservation system (ARS) 150 and the central reservation system (CRS) will each access the established flight schedule database 240, seat allocation database 245, and pricing and restrictions database 250 to perform itinerary queries. In addition, as tickets are sold by the airline 100, the ARS 150 or CRS 300 will decrement the available inventory in the seat allocation database 245. In this manner, the seat allocation database 245 maintains an up-to-date representation of the available inventory for both actual flights and special fare listings.

Figure 5:
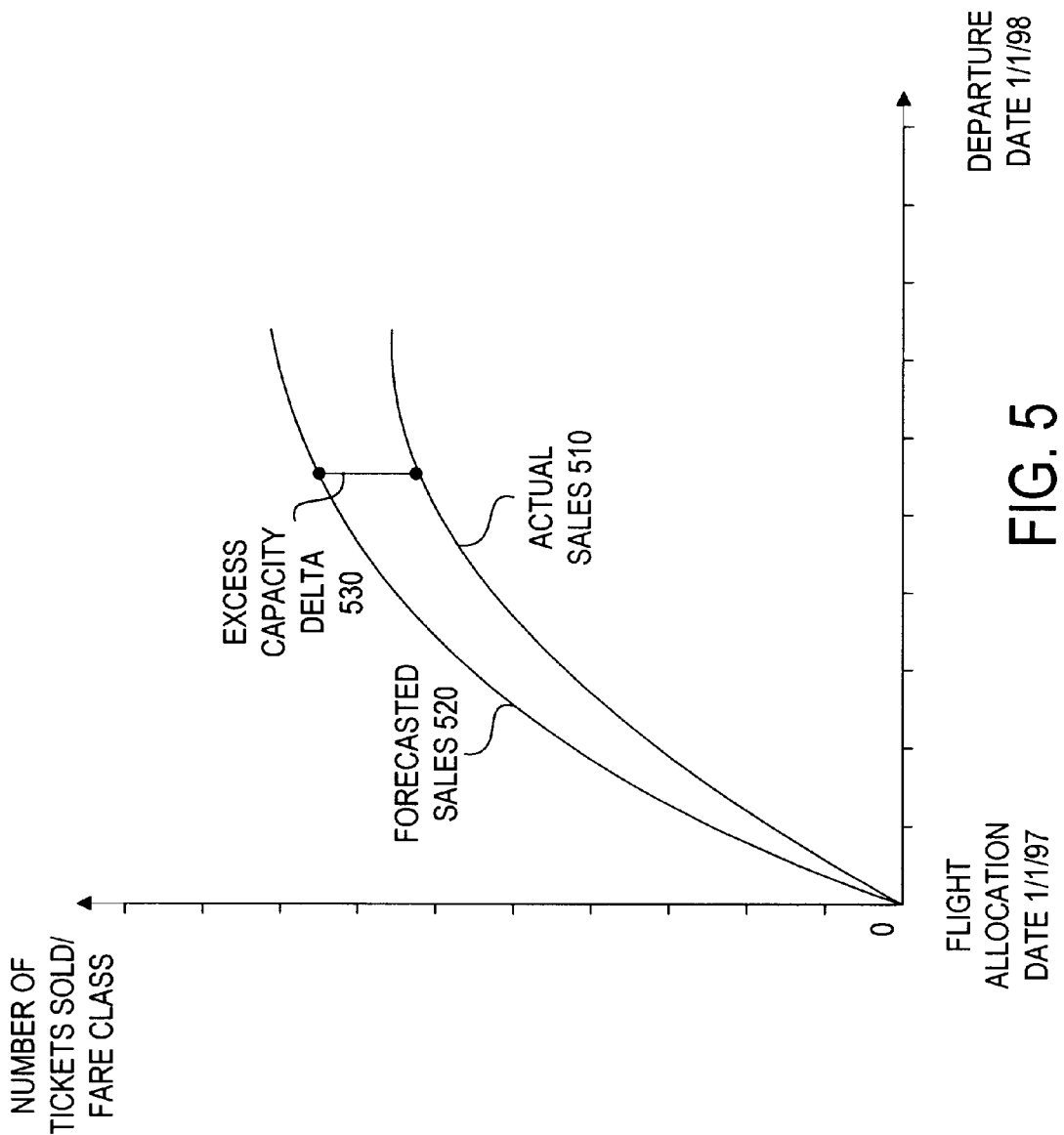
FIG. 5 illustrates the actual demand over time for airline tickets within a given fare class, relative to forecasted demand.

For the actual flights, the RMS 200 will continue to monitor the actual demand 510 within each fare class relative to forecasted demand 520, as maintained in the forecasted demand analysis database 230 and illustrated in FIG. 5. The RMS 200 monitors current actual demand information by retrieving detailed inventory data from the seat allocation database 245 or summary inventory data from the forecasted demand analysis database 230.

An airline 100 can correct for forecasting errors, or competitive forces which have produced unanticipated excess capacity 530 on a specific route by lowering its fare/class on the actual flights. In accordance with the present invention, the airline 100 can also correct for such forecasting errors by increasing the inventory allocated to the special fare listing at a lower fare/class than the currently available fare/class on the actual flights. Due to the discouraged use of unspecified-time tickets by full-fare business travelers, an airline 100 can sell such excess capacity at a discount, without undermining its existing published fare structure. Thus, in a preferred embodiment, the RMS 200 will periodically execute the process discussed below in conjunction with FIGS. 13a and 13b, to make unspecified-time tickets available for purchase by travelers.

FIG. 6 illustrates an exemplary forecasted demand analysis database 230, which records each selling price for each fare class for a given actual flight, and the forecasted demand at each selling price as established by the RMS 200. As previously indicated, when a flight is first added to the flight schedule database of an airline 100, a record of the initial price for each fare class and the forecasted demand is preferably established in the forecasted demand analysis database 230. In addition, new records are preferably created for each new selling price that is established for each fare class by the RMS 200, as part of the dynamic inventory reallocation process.

The forecasted demand analysis database 230 includes a plurality of records, each associated with a different selling price for a given fare class on a given flight. For each flight number in field 605, the forecasted demand analysis database 230 includes the departure date in field 610, the origin and destination locations, in fields 615 and 620 respectively, and the corresponding offered prices and fare classes, in fields 625 and 630 respectively. Finally, the forecasted demand analysis database 230 preferably records the actual quantity of tickets sold by the airline at each offered price for each fare class in field 640 and the corresponding expected quantity in field 650. The actual quantity of tickets sold may be recorded in real-time as tickets are actually sold or by means of batch processing on a periodic basis.

FIG. 7 illustrates an exemplary flight schedule database 240 which preferably stores specific flight information for each origin and destination location pair (O & D Pair). The flight schedule database 240 maintains a plurality of records, each associated with a different flight. For each O&D pair listed in fields 705–710, the flight schedule database 240 includes the date of each flight in field 715, as well as the departure and arrival times of the respective flight in fields 720 and 725. The airline and flight number associated with each flight are preferably indicated, respectively in fields 730 and 735, and any required connections are also indicated in field 740.

FIG. 8 illustrates an exemplary seat allocation database 245 which maintains available inventory information for each fare class on a given flight offered by the airlines 100, as allocated and updated by the RMS 200. In addition, as inventory is sold by an airline, the ARS 150 will preferably decrement the available inventory recorded in the seat allocation database 245. The seat allocation database 245 includes a plurality of records, each associated with a different flight. For each flight identified by a flight number in field 805, the seat allocation database 245 includes the departure date of the flight in field 810 and the respective inventory available in each inventory class in fields 815 and 820. In addition, the seat allocation database 245 preferably includes an indication of the total number of seats booked on the flight in field 825.

Figure 9:
FIG. 9 illustrates an exemplary pricing and restrictions database.

FIG. 9 illustrates an exemplary pricing and restrictions database 250 which maintains pricing information and related restrictions for each flight offered by an airline 100, as established and updated by the RMS 200. The pricing and restrictions database 250 includes a plurality of records, each associated with a different flight. For each flight identified by flight number in field 905, the pricing and restrictions database 245 includes the date of the flight in field 910 and the respective price and restrictions associated with each inventory class in fields 915–930.

FIG. 10 illustrates an exemplary reservations database 255 which maintains booking information for each flight offered by an airline 100. The reservations database 255 includes a plurality of records, each associated with the booking of a ticket for a particular flight. Each record includes fields for a flight number in field 1005, the O&D pair for the flight in field 1010, the carrier in field 1015, the class of ticket booked in field 1020, the price of the ticket in field 1025, and the passenger name record (PNR) number created upon booking in field 1030.

Figure 11A:
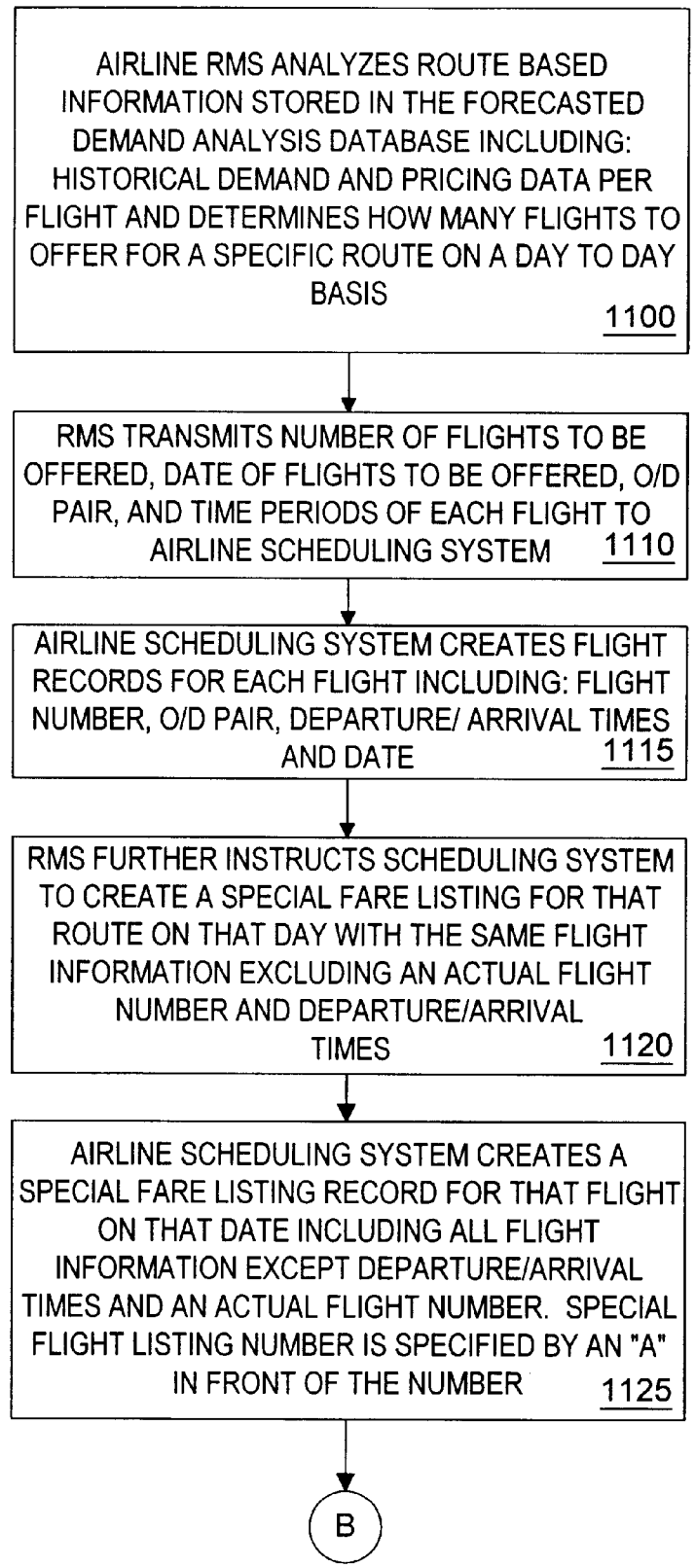
FIG. 11a–11c are flow charts illustrating an exemplary process by which an airline's RMS creates both actual flights and special fare listings.
Figure 11B:
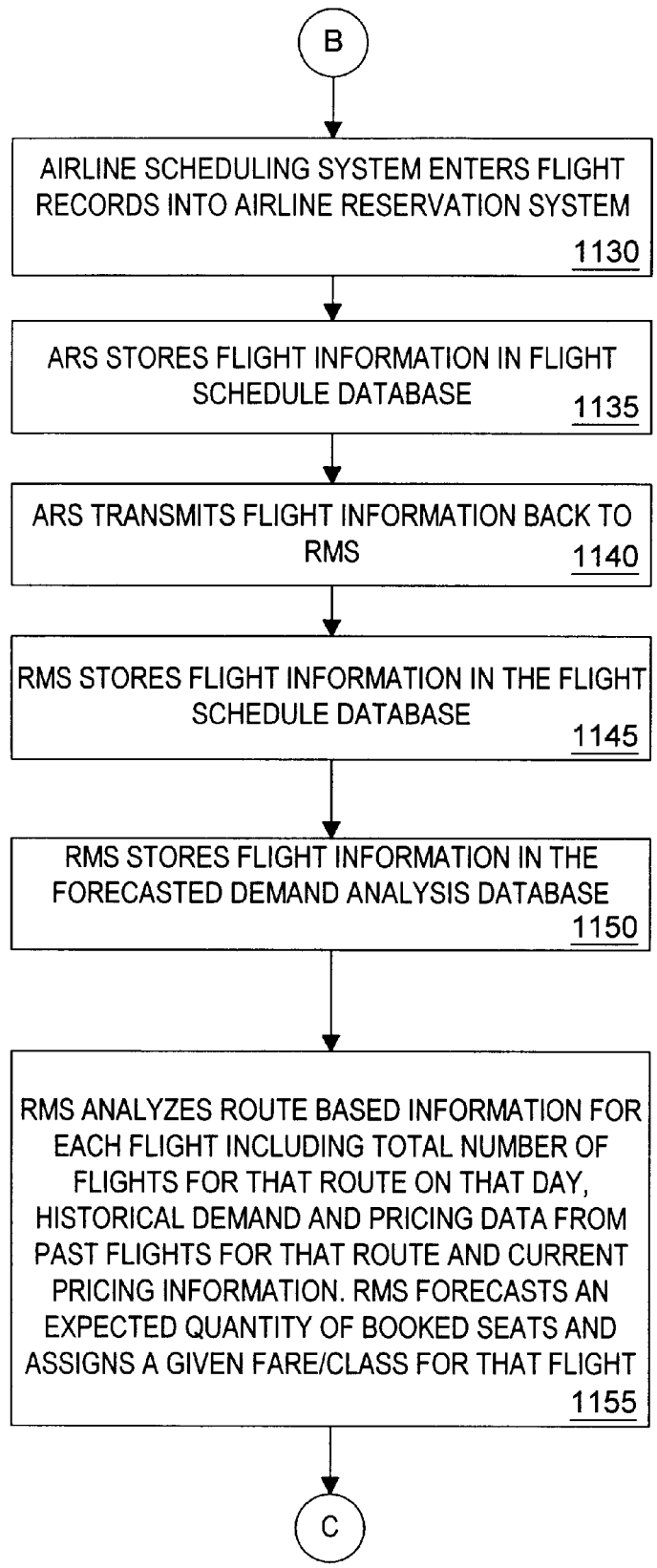
Figure 11C:
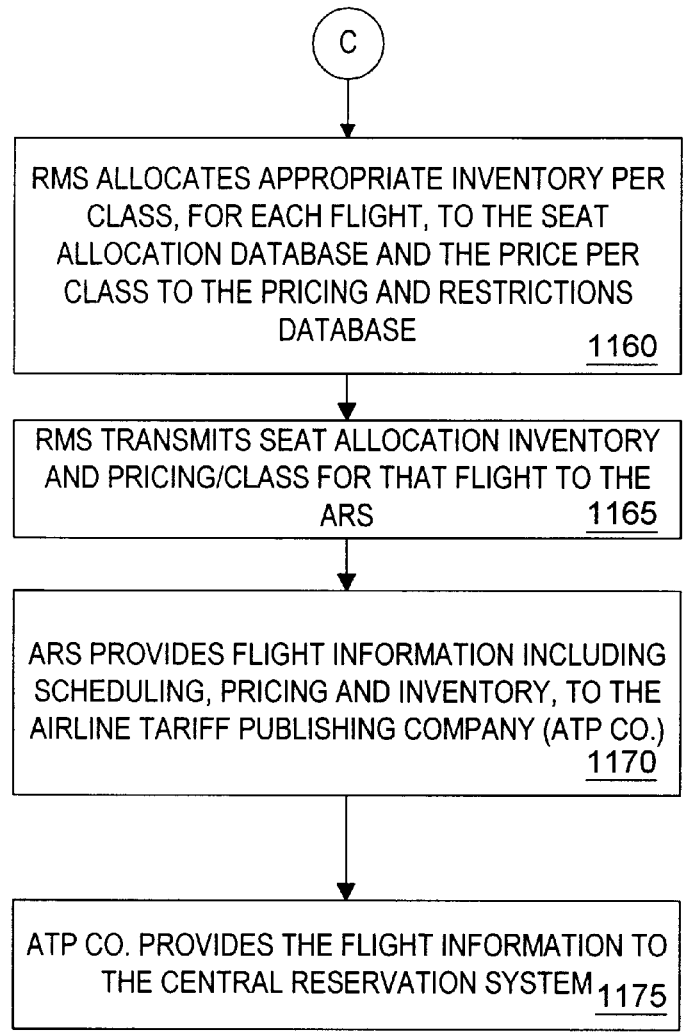

FIGS. 11a–11c are flow charts illustrating an exemplary process by which an airline's RMS creates both actual flights and special fare listings.

In step 1100, the airline's RMS 200 determines the number of actual flights to be offered for a specific route (e.g., NY-LA) on a specific day. In this regard, the RMS 200 accesses the forecasted demand analysis database 230 and analyzes route-based information stored therein. Such information includes historical demand and pricing data for similar flights from previous relevant time periods.

In step 1110, the RMS 200 transmits the O&D pair, the flight date, the number of flights to be offered, and the departure times to the airline scheduling system 160. The scheduling system 160, in step 1115, then creates a flight record for each flight. The flight record includes a flight number, the O&D pair, the departure date and time, an arrival date and time, an airline, and any restrictions.

The RMS 200, in step 1120, also instructs the airline scheduling system 160 to create a special fare listing for the same route on the same day. In step 1125, the scheduling system 160 then creates a flight record for the special fare listing. The flight record will contain essentially the same information as the records created in step 1115, except that the departure and arrival times in fields 720 and 725 (See FIG. 7), respectively, will be unpopulated and, the flight number in field 735 will be preceded by an "A" indicating a special fare listing, rather than an actual flight.

Referring to FIG. 11b, in step 1130, the airline scheduling system 160 enters the flight records (corresponding to both actual flights and special fare listings) into the ARS 150. In steps 1135–1140, the ARS 150 stores the flight records in the flight schedule database 240 and then transmits the records to the RMS 200. In step 1145, the RMS 200 also stores the flight records in the flight schedule database 240. The RMS 200, in step 1150, uses the information corresponding to each actual flight (i.e., flight number, O&D pair, and departure date) to generate a record for the actual flight in the forecasted demand analysis database 230.

In step 1155, the airline's RMS 200 forecasts an expected quantity of booked seats for each actual flight (i.e., the expected demand for the actual flight) and calculates a fare/class for the actual flight. In this regard, the RMS 200 accesses the forecasted demand analysis database 230 and analyzes route-based information for each actual flight, including: (1) the total number of actual flights for the specified route on the specified day; (2) historical demand and pricing data from past flights for the specified route during the relevant time period; and (3) current pricing information (e.g., external events, which may affect pricing, such as the Olympics or a fare war). The RMS 200 then enters the expected quantity of booked seats for each actual flight together with the fare/class for the actual flight into the forecasted demand analysis database 230.

With reference to FIG. 11c, in step 1160, the RMS 200 allocates inventory for each class on each actual flight sufficient to satisfy the expected demand calculated in step 1155. The RMS 200 then stores the inventory allocated in step 1160 and the fare/class calculated in step 1155, in the seat allocation database 245 and the pricing and restrictions database 250, respectively. The RMS 200 also allocates inventory and pricing for the special fare listing. The allocation of inventory and pricing to the special fare listing is discussed in detail below in conjunction with FIG. 12.

In step 1165, the RMS 200 transmits the inventory and fare/class for each flight (both the actual flights and the special fare listing) to the ARS 150. The ARS 150 provides the scheduling, inventory and pricing information for each flight to the Airline Tariff Publishing Company (ATP Co.) 115 in step 1170. Thereafter, in step 1175, the ATP Co. 115 sells this information to the central reservation system (CRS) 300. The CRS 330 then creates records similar to those created by the RMS 200 in the flight schedule database 240, seat allocation database 245, and pricing and restrictions database 250. Tickets are thus made available to travel agents 110 and their customers through the CRS 300 or, alternatively, to travelers 105 directly via the ARS 150.

Figure 12:
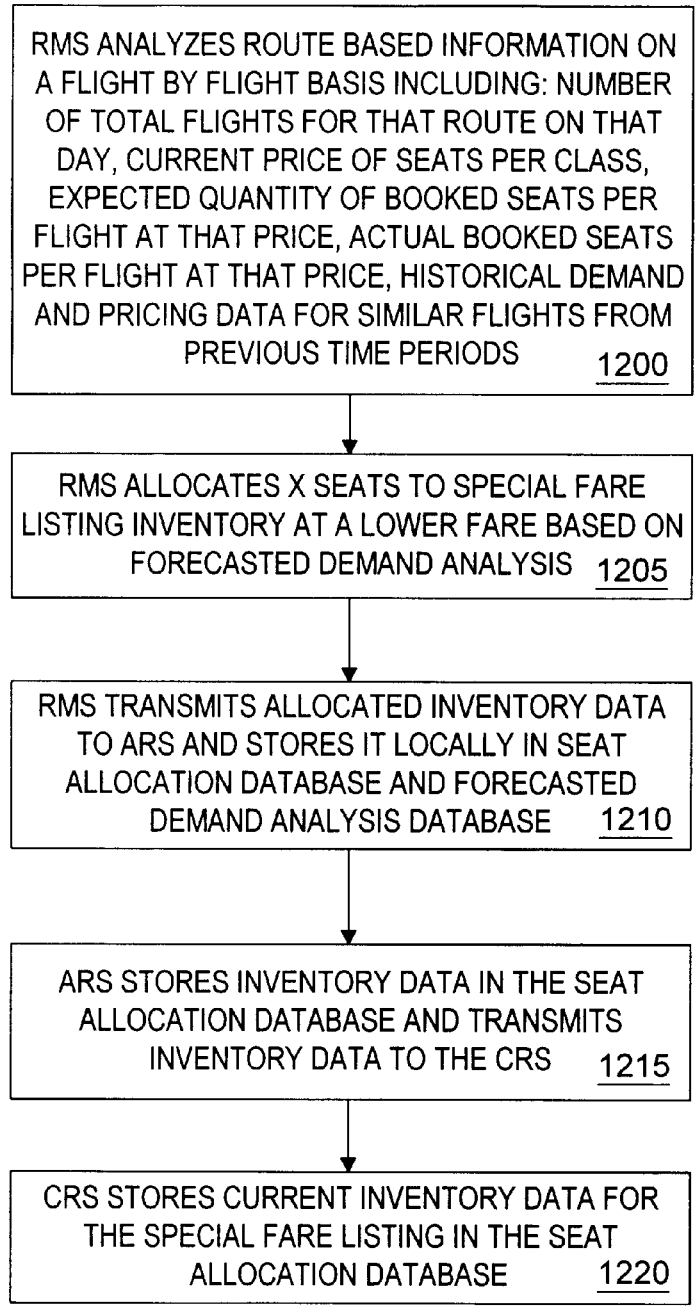
FIG. 12 is a flow chart illustrating an exemplary process by which an airline's RMS initially allocates inventory to a special fare listing.

FIG. 12 is a flow chart illustrating an exemplary process by which an airline's RMS 200 initially allocates inventory to a special fare listing.

In step 1200, the RMS 200 analyzes route-based information stored in the forecasted demand analysis database 230, the seat allocation database 245 and pricing and restrictions database 250, including: (1) the total number of actual flights for the specified route for the specified day; (2) the current fare/class on those flights; (3) the actual quantity of seats booked within each fare class on those flights relative to the expected quantity of seats booked; and (4) historical demand and pricing data for similar flights from previous relevant time periods.

In an effort to encourage sales, and thus, minimize the difference or gap (See FIG. 5) between the expected and actual quantity of tickets booked on the actual flights, the RMS 200, in step 1205, allocates inventory to the special fare listing at a lower fare/class than the currently available fare/class for the actual flights, based on the analysis in step 1200. As determined by the airline, inventory may be allocated to the special fare listing either at the time actual flights are created or, some time thereafter, as a gap develops between the actual and the expected quantity of seats booked on the actual flights. In step 1210, the RMS 200 generates and stores a record of the inventory allocated to the special fare listing and the associated fare/class in the seat allocation database 245 and pricing and restrictions database 250, respectively.

It is to be understood that the RMS 200 may also track the inventory allocated to the special fare listing and the associated fare/class together with the actual quantity of inventory booked at the fare/class in the forecasted demand analysis database 230. Over time, this will provide the RMS 200 with a demand curve for each selling price at a given fare/class for the special fare listing. This information can then be used by the RMS 200 in step 1205, in addition to the information in step 1200, to determine how much inventory to allocate to the special fare listing and, how much lower than the current fare/class on the actual flights to price each class of the special fare listing.

In step 1210, the RMS 200 also transmits the inventory and fare/class information to the ARS 150. In step 1215, the ARS 150 stores the information locally and then transmits it to the CRS 300, directly, or via the ATP Co. 115. In step 1220, the CRS 300 also stores the allocated inventory and fare/class in the seat allocation database 245 and pricing and restrictions database 250, respectively.

It is to be understood that an airline may allocate inventory to a special fare listing which requires traveler concessions in addition to flight-time flexibility. Fare discounts would then be commensurate with the degree of flexibility afforded the airline in placing the traveler aboard an actual flight. For example, the airline may offer unspecified-time tickets for particular fare classes only, such as first class (K Class), coach (Y Class), one-stop, etc. The airline may also choose to limit unspecified-time tickets to "groups" of travelers (e.g., two or more, or any other number specified by the airline). Further examples of such concessions of flexibility include, but are not limited to, (1) the origin (if there is more than one airport in the area local to the traveler); (2) the destination (if there is more than one airport accessible for the traveler's ultimate destination); (3) the maximum travel time; (4) the number of stops; (5) the number of plane changes; and (6) whether or not non-jet aircraft (e.g., propeller planes) are involved.

Figure 13A:
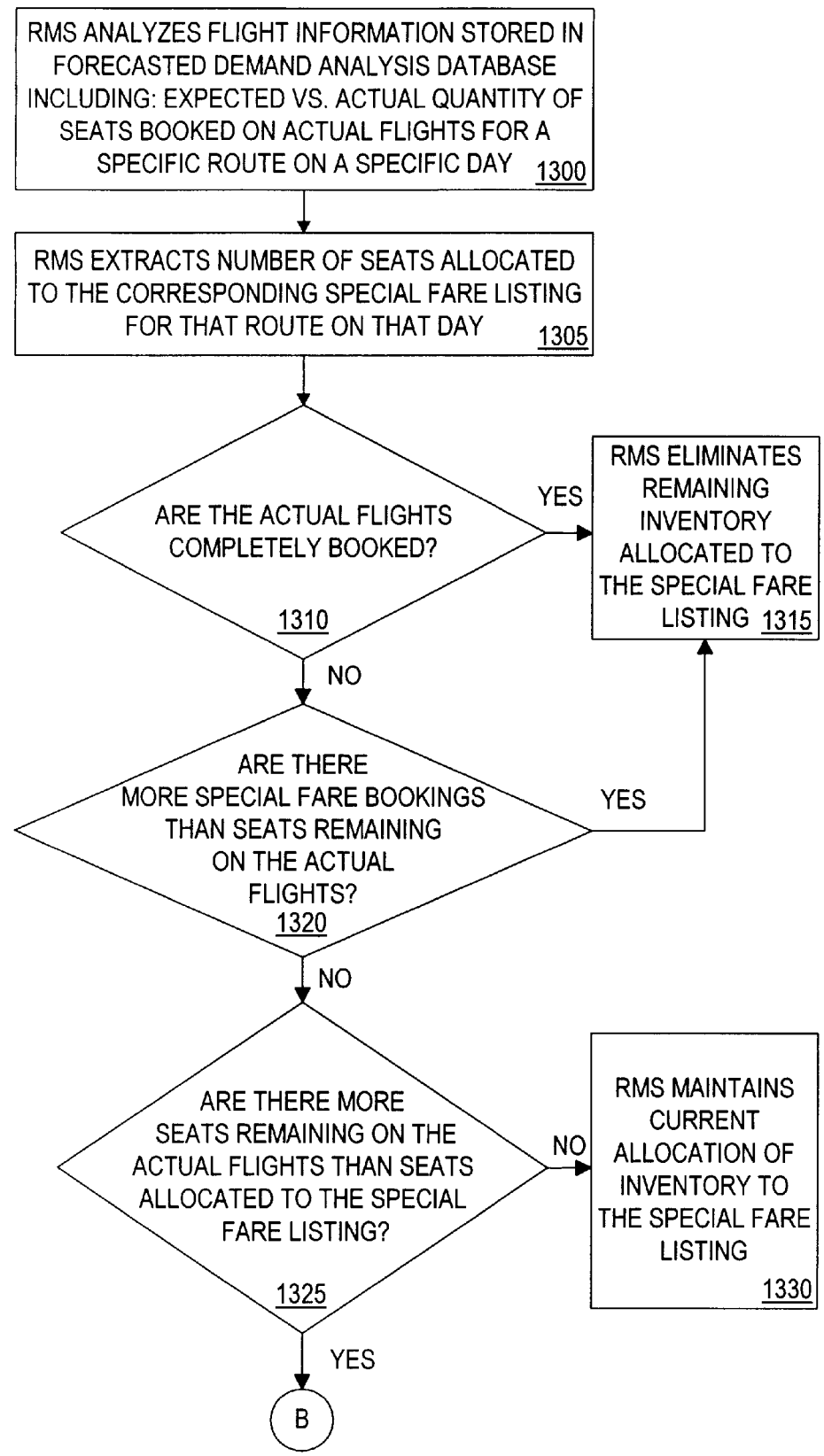
FIGS. 13a and 13b are flow charts illustrating an exemplary process by which an airline's RMS dynamically increases or decreases the allocation of inventory to a special fare listing.
Figure 13B:
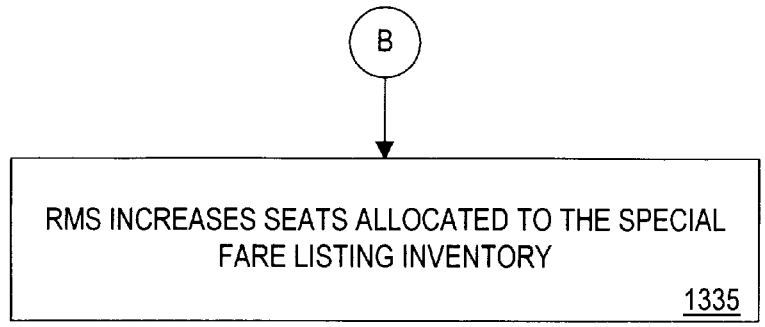

FIGS. 13a and 13b are flow charts illustrating an exemplary process by which an airline's RMS dynamically increases or decreases the allocation of inventory to a special fare listing.

In step 1300 of FIG. 13a, the RMS 200 accesses route-based information stored in the forecasted demand analysis database 230, including the actual quantity of seats booked within each fare class relative to the expected quantity of seats booked on a specific route on a specific day, to determine whether there is unanticipated excess capacity associated with the route on that day.

In step 1305, the RMS 200 accesses the seat allocation database 245 and retrieves the records corresponding to each actual flight for the specific route on the specific day. The RMS also retrieves the record corresponding to the special fare listing for the same route on the same day.

In step 1310, the RMS analyzes the records retrieved from database 245 corresponding to each actual flight to determine whether each actual flight is completely booked (e.g., in FIG. 8, "Remaining Inventory"=0). If each flight is completely booked, the RMS 200, in step 1315, accesses database 245 and eliminates the remaining inventory allocated to the special fare listing (e.g., "Remaining Inventory"→0). For example, a special fare listing during Christmas week may not have any inventory allocated to it because of the heavy traffic that historically comes during the holiday seasons.

If each flight is not completely booked, the RMS 200, in step 1320, determines whether the "Total Inventory Booked" (See FIG. 8) for the special fare listing exceeds the remaining inventory for the actual flights. If it does, the RMS 200, in step 1315, accesses database 245 and eliminates the remaining inventory allocated to the special fare listing. However, if the total inventory booked for the special fare listing does not exceed the remaining inventory for the actual flights, the RMS proceeds to step 1325 and determines whether the remaining inventory for the actual flights exceeds the remaining inventory for the special fare listing. If the remaining inventory for the actual flights does not exceed the remaining inventory for the special fare listing, in step 1330, the RMS 200 maintains the current remaining inventory for the special fare listing. If the remaining inventory for the actual flights exceeds the remaining inventory for the special fare listing, the RMS 200, in step 1335 of FIG. 13*b*, increases the remaining inventory for the special fare listing at a fare/class below the currently available fare/class on the actual flights and updates the seat allocation database 245 and pricing and restrictions databases 250, accordingly.

Figure 14A:
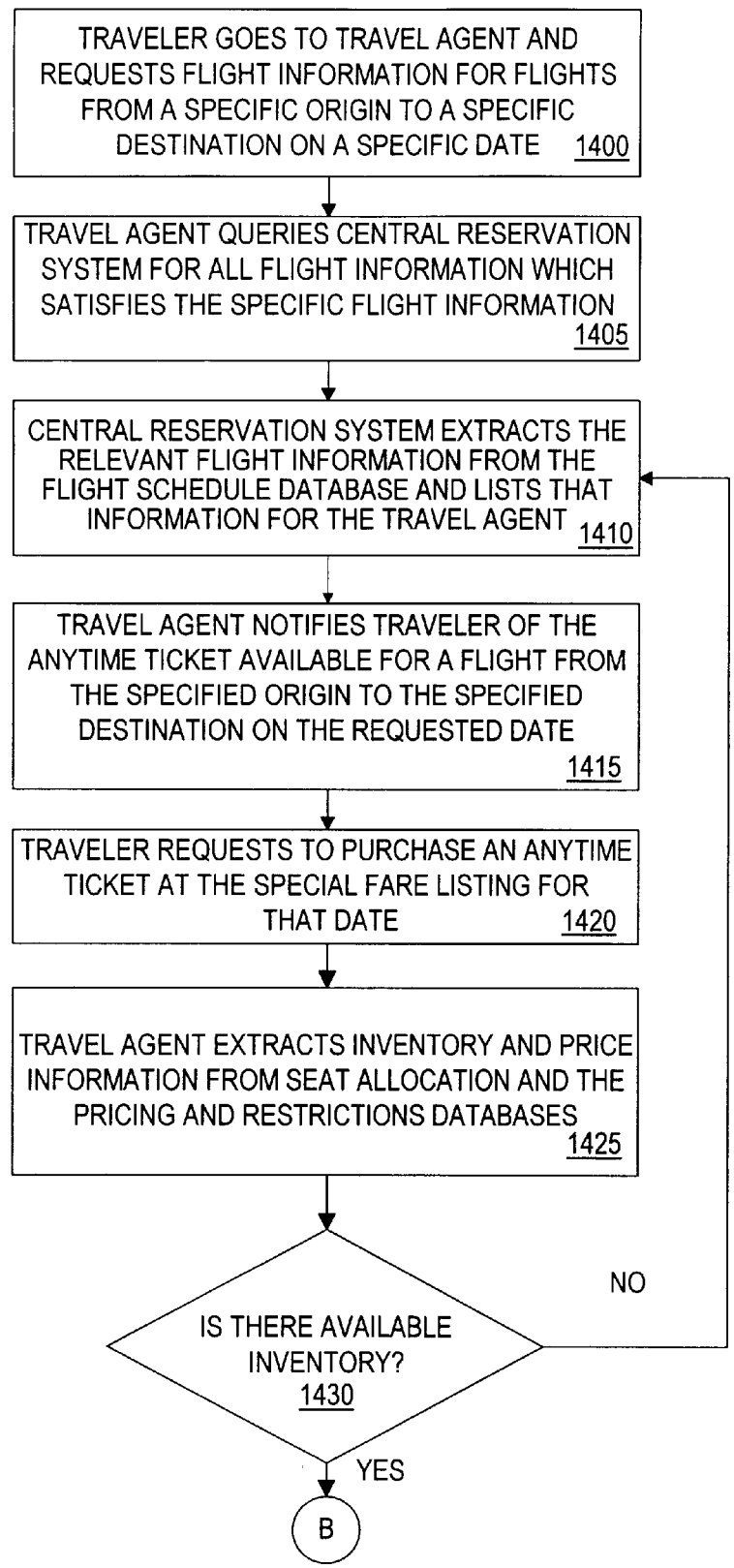
FIGS. 14a and 14b are flow charts illustrating, an exemplary process by which travelers book unspecified-time tickets.
Figure 14B:
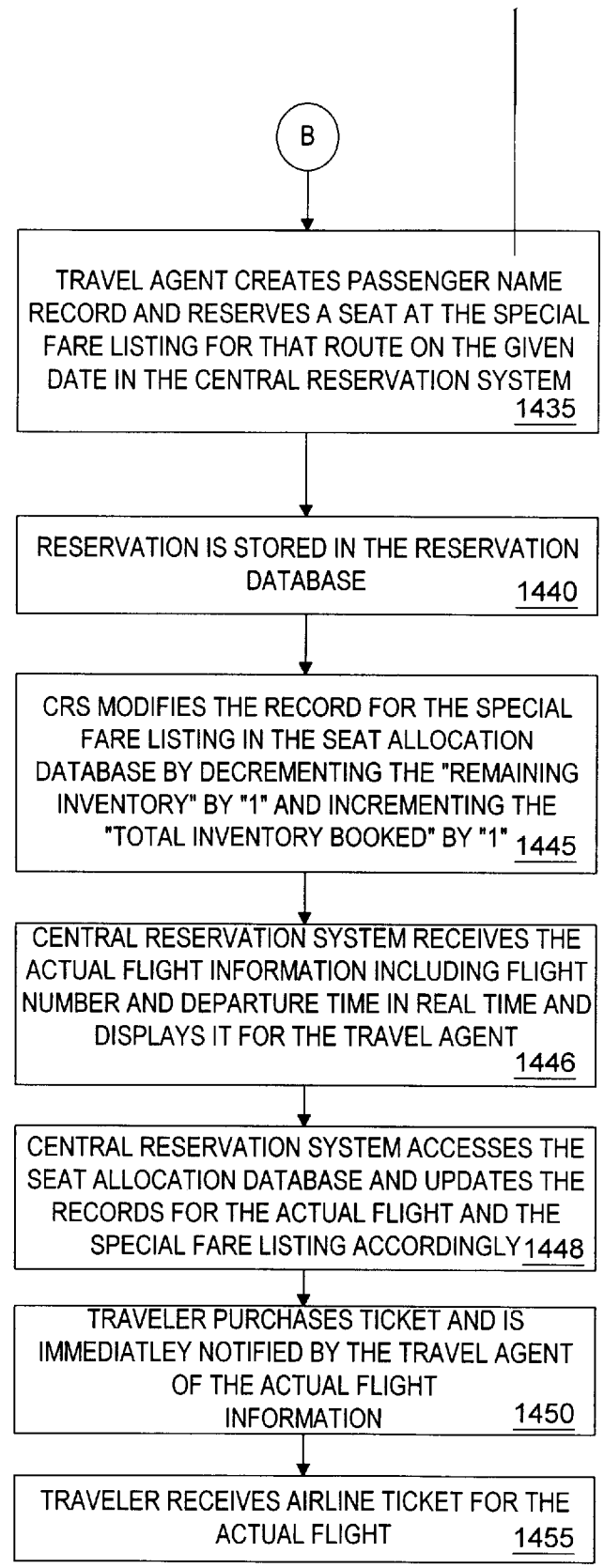

FIGS. 14*a* and 14*b* are flow charts illustrating an exemplary process by which travelers book unspecified-time airline tickets.

In step 1400 of FIG. 14*a*, a traveler 105 contacts his travel agent 110 and requests flight information for a specific itinerary. A specific itinerary necessarily includes the origin and destination locations together with the dates for travel, but may also include such information as travel times, airlines, etc. In step 1405, the travel agent 110 logs into a CRS 300 and queries the CRS 300 for all flights that meet the traveler's specifications. In step 1410, the CRS 300 retrieves the relevant flight information from the flight schedule database 240 and lists the information for the travel agent 110. In step 1415, the travel agent 110 reviews the information and determines whether there is a special fare listing for the requested itinerary. If there is, the travel agent 110 notifies the traveler 105 of the potential availability of an unspecified-time ticket for the requested itinerary and informs the traveler 105 that unspecified-time tickets are offered by the airlines at a lower fare/class than conventional airline tickets.

In step 1420, the traveler 105 instructs the travel agent 110 to purchase the unspecified-time ticket. The travel agent 110, in step 1425, obtains additional details regarding the unspecified-time ticket by retrieving inventory and pricing data for the special fare listing from the seat allocation database 245 and pricing and restrictions database 250, respectively. If there is no inventory remaining for the special fare listing (step 1430), the travel agent 115 will simply re-review the flight information listed by the CRS 300 in step 1410 for actual flight listings. Otherwise, the travel agent 110, in step 1435 of FIG. 14*b*, will book the unspecified-time ticket for the traveler 105 by creating a passenger name record and reserving a seat at the special fare listing in the CRS 300.

In step 1440, the CRS 300 stores the reservation in the reservation database 255. In step 1445, the CRS 300 modifies the record for the special fare listing in the seat allocation database 245 by decrementing the "Remaining Inventory" by "1" and incrementing the "Total Inventory Booked" by "1". In step 1446, the CRS 300 receives the actual flight information from RMS 200, including a flight number and departure time, in real-time (e.g., minutes or even seconds after booking the unspecified-time ticket in step 1435) and displays it for the travel agent 110. In step 1448, the CRS 300 accesses the seat allocation database 245 and modifies the record for the actual flight by incrementing the "Total Inventory Booked" by "1" and decrementing the "Total Seats Remaining" by "1". The CRS 300 also modifies the record for the special fare listing by decrementing the "Total Inventory Booked" by "1". In step 1450, the traveler 105 purchases the unspecified-time ticket and is immediately notified by the travel agent 110 of the actual flight information, including a flight number and departure time. In step 1455, the traveler receives an airline ticket for the actual flight.

In an alternate embodiment, the CRS 300 does not receive the actual flight information in real-time. Thus, when the traveler 105 purchases the unspecified-time ticket in step 1450, he receives only the flight number for the special fare listing and a notification date, by which date the traveler 105 will be provided with the actual flight number and a departure time. In step 1455, the traveler 105 then receives an airline ticket, including an actual flight number and departure time, either prior to, or by, the notification date.

Figure 15A:
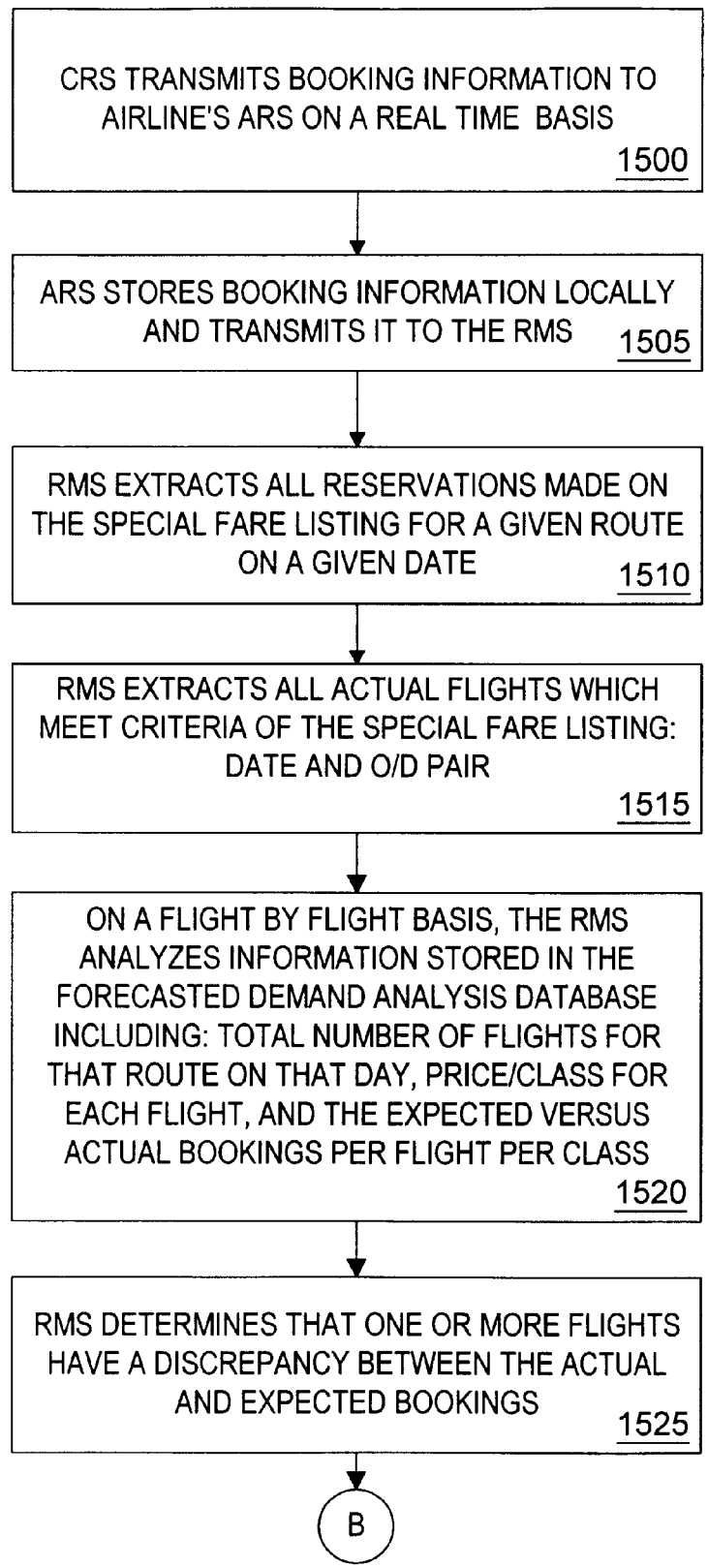
FIGS. 15a and 15b are flow charts illustrating an exemplary process by which an airline's RMS selects an actual flight on which to place an unspecified-time ticket holder.
Figure 15B:
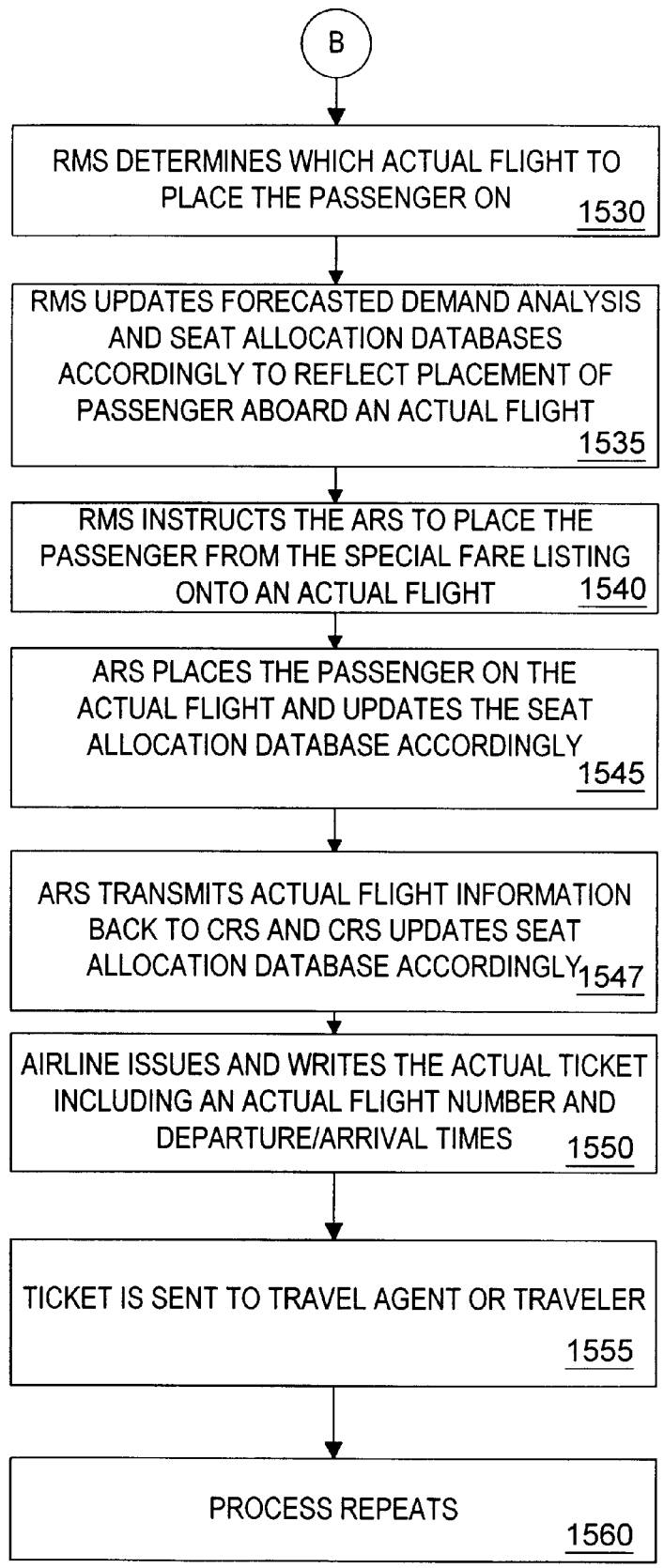

FIGS. 15*a* and 15*b* are flow charts illustrating an exemplary process by which an airline's RMS selects an actual flight on which to place an unspecified-time ticket holder. In step 1500, the CRS 300 transmits the booking records stored in the reservation database 255 for each airline to that airline's ARS 150 on a real-time basis. The ARS 150, in step 1505, stores the information locally and then transmits it to the RMS 200. In step 1510, the RMS 200 accesses the reservation database 255 and retrieves the booking records corresponding to a given special fare listing. In step 1515, the RMS 200 accesses the flight schedule database 240 and retrieves the records of all actual flights which satisfy the itinerary (i.e., O/D pair and date) of the special fare listing.

In step 1520, the RMS 200 analyzes on a flight-by-flight basis information stored in the forecasted demand analysis database 230, including: (1) the total number of actual flights for the specified route for the specified day; (2) the current fare/class on each flight; and (3) the expected vs. the actual quantity of booked seats for each class on each actual flight.

In step 1525, the RMS 200 determines whether the expected bookings on one or more of the actual flights exceeds the actual bookings for those flights. The RMS 200, in step 1530 of FIG. 15*b*, selects one of the actual flights as the flight on which to place the unspecified-time ticket holder. In step 1535, the RMS 200 updates the forecasted demand analysis database 230 and seat allocation database 245, accordingly. In particular, the RMS 200 accesses the forecasted demand analysis database 230 and modifies the record for the actual flight by incrementing the "Actual Quantity Booked" by "1". The RMS 200 also accesses the seat allocation database 245 and modifies the record for: (1) the actual flight by incrementing the "Total Inventory Booked" by "1" and decrementing the "Total Seats Remaining" by "1"; and (2) the special fare listing by decrementing the "Total Inventory Booked" by "1".

In an alternate embodiment, the RMS 200 performs steps 1515 through 1535 for a predetermined number of bookings, even before receiving the booking records from the CRS 300. Thereafter, the RMS 200 can access this information upon receiving each booking record from the CRS 300 to further expedite the placement of the unspecified-time ticket holder aboard an actual flight.

In step 1540, the RMS 200 instructs the ARS 150 to place the passenger on the actual flight. The ARS 150, in step 1545, places the passenger on the actual flight and updates the seat allocation database 245 in the same manner updated by the RMS 200 in step 1535. In step 1547, the ARS 150 transmits the actual flight information back to the CRS 300. The CRS 300 receives the actual flight information in real-time (e.g., minutes or even seconds after it transmits the booking records to the ARS 150 in step 1500). The CRS 300 also updates the seat allocation database 245 in the same manner updated by the RMS 200 in step 1535.

In step 1550, the airline 100 prints the ticket for the actual flight with the actual flight number and the departure/arrival times. In step 1555, the airline 100 transmits the ticket to the traveler 105, either directly or via the travel agent 110.

In step 1560, the process of selecting an actual flight on which to place an unspecified-time ticket holder repeats for either another booking record corresponding to the same special fare listing (e.g., return to step 1530) or a booking record corresponding to a different special fare listing (e.g., return to step 1510).

In an alternate embodiment, the selection of an actual flight on which to place an unspecified-time ticket holder is not a real-time transaction. For example, the CRS 300 may transmit the booking records stored in the reservation database 255 to the ARS 150 on a periodic, rather than a real-time, basis. Similarly, the CRS 300 and the ARS 150 may receive the actual flight information from the RMS 200 hours, days or even weeks, after transmitting the booking records to the ARS 150.

With respect to this alternate embodiment, in the event that a traveler purchases an unspecified-time ticket close to the date of departure (e.g., a week or less), the travel agent or airline may have insufficient time to forward to the traveler a ticket with the actual flight data printed thereon. In that case, the airline can issue a ticket with the actual flight data except for the flight number and departure time. Once the airline has selected an actual flight for the traveler, the airline would provide the traveler directly, or through his travel agent, with a verification code together with the flight number and departure time. The traveler would then present both the initial ticket and the verification code when boarding the plane. Alternatively, the airline could forego issuing the initial ticket and the traveler would simply receive the verification code and use it to pick up the actual ticket at the airline's desk prior to departure. The traveler would then present the actual ticket when boarding. In addition, the airlines could use electronic ticketing ("E-Tickets") to fulfill short term ticketing requirements.

An alternate embodiment of the present invention permits an airline to conceal its identity when offering for sale, via a CRS, discounted tickets for flights on a specified route (e.g., NY-LA) on a specified day. As such, this alternate embodiment permits an airline to fill empty seats on its flights without having to lower its own published air fares and initiating a fare war.

The airline conceals its identity from users of the CRS (e.g., travel agents or other airlines) by creating, and submitting to the CRS for posting, an alias flight record corresponding to each actual flight on a specified route on a specified day. The alias flight record is stored in the flight schedule database of the CRS (as well as the ARS and RMS) and contains all of the relevant flight information except for a carrier name, an actual flight number and precise departure/arrival times. The alias flight record is, as its name implies, an "alias" for the corresponding actual flight record, which is also stored in the flight schedule database, but for which discounted tickets are not offered.

Instead of an actual flight number and precise departure/arrival times, the alias flight record contains an alias flight number and time windows (e.g., 8:00 am to 11:00 am, "afternoon", etc.), respectively. As such, users accessing the alias flight record are unable to ascertain the identity of the airline (either by way of an actual flight number or a precise departure/arrival times) offering the discounted tickets. The time windows provide customers with useful information regarding the departure/arrival times of the actual flight, but not enough information for a travel agent or another airline to identify the carrier. As with unspecified-time tickets, the time windows (coupled with the discounted fares) make these "concealed carrier" tickets particularly attractive to leisure travelers. It is to be understood that the alias flight record may also optionally include the model of the plane (e.g., Boeing 737), the number of seats on the plane, or any other means by which a travel agent querying the CRS could assure his customer that the customer, upon booking a concealed carrier ticket, will be flying on a reputable airline.

Moreover, although inaccessible to its users, the CRS contains an alias flight database, which it uses to correlate alias flight numbers with actual flight numbers and carriers (e.g., Alias Flight No. CC78969 corresponds to Continental Airlines Flight No. 36535). This correlation capability permits the CRS to relay bookings of tickets relating to alias flight records to the appropriate carrier and update inventory for the actual flights based on these bookings.

The alias flight records (and the related records in the forecasted demand analysis, seat allocation, pricing and restrictions, and reservation databases) in the RMS, ARS and CRS are created and updated in substantially the same manner as records for special fare listings relating to unspecified-time tickets. The primary difference is as follows: when a customer books an unspecified-time ticket corresponding to a special fare listing, the CRS is unaware of the actual flight upon which the customer will be placed and thus, the CRS must wait to receive this information from the airline before it can update inventory for both the special fare listing and the actual flight. In contrast, when a customer books a concealed carrier ticket corresponding to an alias flight record, the CRS knows the corresponding actual flight and thus, can update inventory immediately. Another difference is that the special fare listing for an unspecified-time ticket is created by the RMS on a "one-per-route" basis, whereas the alias flight record for the concealed carrier ticket is created on a "one-per-flight" basis.

Furthermore, the ticketing process for concealed carrier tickets is also similar to one of the ticketing processes discussed above with respect to unspecified-time tickets. Upon booking a concealed carrier ticket in the CRS, the travel agent issues and transmits to the customer a certified voucher containing the alias flight number and the PNR number created in the CRS. Once the airline receives the booking information from the CRS, it provides the travel agent with a predetermined notification date (e.g., 24 hours prior to departure), by which date the customer directly or, through the travel agent, will be provided with the carrier identity, actual flight number, and actual departure time. On the day of departure, the customer presents the certified voucher at the airline's flight desk, where the airline confirms the PNR number in the CRS and, if all is in order, presents the customer with a stub from the voucher for boarding the plane. Alternatively, as with unspecified-time tickets, the airline could use electronic ticketing to fulfill such short term ticketing requirements.

The many features and advantages of the present invention are apparent from the detailed specification, and thus, it is intended by the appended claims to cover all such features and advantages of the invention which fall within the true spirit and scope of the present invention.

Furthermore, since numerous modifications and variations will readily occur to those skilled in the art, it is not desired that the present invention be limited to the exact construction and operation illustrated and described herein, and accordingly, all suitable modifications and equivalents which may be resorted to are intended to fall within the scope of the claims.

We claim:

1. A method comprising the steps of:

viewing, using a computer, special fare listing information for air travel to a specified destination location from a specified departure location within a specified time range, said special fare listing information excluding a specified departure time;

transmitting, using a computer, a request to purchase a commitment for carriage corresponding to said special fare listing information;

receiving a commitment for carriage, including an obligation by an airline to provide a seat on a flight, that satisfies said request but does not specify a departure time;

accepting said commitment for carriage; and receiving at a time subsequent to said accepting an identification of said departure time.

2. The method of claim 1, wherein said step of accepting said commitment for carriage includes one of reserving a ticket or purchasing a ticket.

3. The method of claim 1, wherein said transmitting a request includes transmitting a request to purchase a ticket for a group of two or more travelers.

4. The method of claim 1, wherein said receiving a commitment for carriage includes receiving a commitment for carriage that further does not specify a price term.

5. The method of claim 4, further comprising the steps of:

transmitting a bid for said commitment for carriage; and receiving an acceptance of said bid.

6. The method of claim 5, wherein said bid is a guaranteed bid.

7. The method of claim 1, wherein said receiving a commitment for carriage includes receiving a commitment for carriage that further does not specify an airline.

8. The method of claim 1, wherein said receiving a commitment for carriage includes receiving a commitment for carriage that further does not specify a parameter selected from the group consisting of a departing airport, a destination airport, a total travel time, a number of stops, and a number of plane changes.

9. The method of claim 1, further comprising the step of receiving a ticket without a departure time provided thereon.

10. The method of claim 9, wherein said step of receiving at a later time an identification of said departure time includes receiving a ticket with said departure time provided thereon.

11. A method comprising the steps of:

receiving a request to purchase a ticket to travel from a specified departure location to a specified destination location within a specified time range;

querying, using a computer, a central reservation system to determine a special fare listing that satisfies said request but does not specify a departure time;

receiving, using a computer, said special fare listing;

booking a ticket relating to said special fare listing;

receiving at a time subsequent to said commitment an identification of said departure time; and initiating a notice of said departure time.

12. The method of claim 11, wherein said receiving a request includes receiving a request to purchase a ticket for a group of two or more travelers.

13. The method of claim 11, wherein said receiving a special fare listing includes receiving a special fare listing that further does not specify a price term.

14. The method of claim 13, further comprising the steps of:

transmitting a bid for said ticket; and receiving an acceptance of said bid.

15. The method of claim 14, wherein said bid is a guaranteed bid.

16. The method of claim 11, wherein said receiving a special fare listing includes receiving a special fare listing that further does not specify an airline.

17. The method of claim 11, wherein said receiving a special fare listing includes receiving a special fare listing that further does not specify a parameter selected from the group consisting of a departing airport, a destination airport, a total travel time, a number of stops, and a number of plane changes.

18. The method of claim 11, further comprising the step of receiving a ticket without said departure time provided thereon.

19. The method of claim 11, wherein said step of receiving at a later time an identification of said departure time includes receiving a ticket with said departure time provided thereon.

20. A method of using a computer to process an airline ticket request, comprising the steps of:

creating a special fare listing for air travel to a specified destination location from a specified departure location within a specified time range, said special fare listing excluding a specified departure time;

outputting said special fare listing via an electronic reservation system;

examining a plurality of flights which would fulfill the specified terms of a ticket relating to said special fare listing to determine which of said plurality of flights to select for said ticket, each of said plurality of flights including a specified departure time;

selecting one of said plurality of flights; and outputting notification of flight information, including a specified depart time, corresponding to said selected flight.

21. The method of claim 20, wherein said step of examining a plurality of flights is performed after booking of said ticket.

22. The method of claim 20, wherein said step of examining a plurality of flights is performed prior to booking of said ticket.

23. The method of claim 21, wherein said booking of said ticket specifies groups of two or more travelers.

24. The method of claim 20, wherein said creating a special fare listing includes creating a special fare listing that further does not specify a price term.

25. The method of claim 24, further comprising the steps of:

receiving a bid for said ticket; and transmitting an acceptance of said bid.

26. The method of claim 25, wherein said bid is a guaranteed bid.

27. The method of claim 20, wherein said creating a special fare listing includes creating a special fare listing that further does not specify an airline.

28. The method of claim 20, wherein said creating a special fare listing includes creating a special fare listing that further does not specify a parameter selected from the group consisting of a departing airport, a destination airport, a total travel time, a number of stops, and a number of plane changes.

29. The method of claim 20, further comprising the step of:

upon booking of said ticket, providing a ticket without a departure time indicated thereon.

30. The method of claim 20, wherein said step of outputting notification includes the step of providing a ticket with said departure time indicated thereon.

31. A method of using a computer to process an airline ticket booking, comprising the steps of:

receiving a special fare listing for air travel to a specified destination location from a specified departure location within a specified time range, said special fare listing excluding a specified departure time;

transmitting said special fare listing to a buyer;

receiving a booking of a ticket corresponding to said special fare listing from said buyer;

transmitting said booking information to an airline; and receiving an identification of a flight selected by said airline which fulfills the terms of said ticket, said selected flight including a specified departure time.

32. The method of claim 31 wherein said airline includes a revenue management system.

33. The method of claim 31, wherein said booking of a ticket is limited in terms of availability to groups of two or more travelers.

34. The method of claim 31, wherein said buyer is a travel agent.

35. The method of claim 31, wherein said receiving a special fare listing includes receiving a special fare listing that further does not specify a price term.

36. The method of claim 35, further comprising the steps of:

after providing said special fare listing but before receiving a booking of said ticket, receiving a bid for said ticket from said buyer; and transmitting an acceptance of said bid to said buyer.

37. The method of claim 36, wherein said bid is a guaranteed bid.

38. The method of claim 31, wherein said receiving a special fare listing includes receiving a special fare listing that further does not specify an airline.

39. The method of claim 31, wherein said receiving a special fare listing includes receiving a special fare listing that further does not specify a parameter selected from the group consisting of a departing airport, a destination airport, a total travel time, a number of stops, and a number of plane changes.

40. A method of using a computer to process a ticket booking, comprising the steps of:

receiving a booking of an unspecified-time ticket to a specified destination location from a specified departure location within a specified time range, said unspecified-time ticket excluding a specified departure time;

examining a plurality of flights which would satisfy the specified terms of said unspecified-time ticket to determine which of said plurality of flights to select for said unspecified-time ticket;

selecting one of said plurality of flights; and outputting notice of said selected flight, wherein said selected flight includes a specified departure time.

41. The method of claim 40, wherein said receiving a booking of an unspecified-time ticket includes receiving said booking limited to groups of two or more travelers.

42. The method of claim 40, wherein said receiving a booking of an unspecified-time ticket includes receiving said booking from a central reservation system.

43. The method of claim 40, wherein said receiving a booking of an unspecified-time ticket includes receiving said booking from an airline reservation system.

44. The method of claim 40, wherein said step of examining a plurality of flights includes examining an actual quantity of tickets booked within a fare class on each of said plurality of flights relative to a forecasted quantity of tickets booked within said fare class.

45. The method of claim 44, wherein said step of selecting a flight includes selecting a flight for which said forecasted quantity of tickets booked exceeds said actual quantity of tickets booked.

46. The method of claim 40, wherein said receiving a booking of an unspecified-time ticket includes receiving a booking of an unspecified-time ticket that further does not include a specified airline.

47. The method of claim 40, wherein said receiving a booking of an unspecified-time ticket includes receiving a booking of an unspecified-time ticket that further does not specify a flight parameter selected from the group consisting of a departing airport, a destination airport, a total travel time, a number of stops, and a number of plane changes.

48. The method of claim 40, further comprising the steps of:

analyzing route-based information for actual flights; and allocating inventory to a special fare listing relating to said ticket at a different fare/class than currently available on said actual flights, based on said step of analyzing.

49. A system comprising:

means for creating a special fare listing for air travel to a specified destination location from a specified departure location within a specified time range, said special fare listing excluding a specified departure time;

means for making available said special fare listing via an electronic reservation system;

means for examining a plurality of flights which would fulfill the specified terms of a ticket relating to said special fare listing to determine which of said plurality of flights to select for said ticket, each of said plurality of flights including a specified departure time;

means for selecting one of said plurality of flights; and means for providing notification of flight information, including a departure time, corresponding to said selected flight.

50. The system of claim 49, wherein said means for examining a plurality of flights examines said flights after booking of said ticket.

51. The system of claim 50, wherein said booking of said ticket is limited to groups of two or more travelers.

52. The system of claim 49, wherein said means for creating a special fare listing includes means for creating a special fare listing that further does not specify a price term.

53. The system of claim 52, further comprising:

means for receiving a bid for said ticket; and means for transmitting an acceptance of said bid.

54. The system of claim 53, wherein said bid is a guaranteed bid.

55. The system of claim 49, wherein said means for creating a special fare listing includes means for creating a special fare listing that further does not specify an airline.

56. The system of claim 49, wherein said means for creating a special fare listing includes means for creating a special fare listing that further does not specify a parameter selected from the group consisting of a departing airport, a destination airport, a total travel time, a number of stops, and a number of plane changes.

57. The system of claim 49, further comprising:
upon booking of said ticket, means for providing a ticket without a departure time indicated thereon.

58. A system comprising:
means for receiving a special fare listing for air travel to a specified destination location from a specified departure location within a specified time range, said special fare listing excluding a specified departure time;
means for providing said special fare listing to a buyer;
means for receiving a booking of a ticket corresponding to said special fare listing from said buyer;
means for transmitting said booking to an airline; and
means for receiving an identification of a flight selected by said airline which fulfills the terms of said ticket, said selected flight including a specified departure time.

59. The system of claim 58, wherein said airline includes a revenue management system.

60. The system of claim 58, wherein said booking of a ticket is limited in terms of availability to groups of two or more travelers.

61. The system of claim 58, wherein said buyer is a travel agent.

62. The system of claim 58, wherein said means for receiving a special fare listing includes means for receiving a special fare listing that further does not specify a price term.

63. The system of claim 62, further comprising:
means for receiving a bid for said ticket from said buyer; and
means for transmitting an acceptance of said bid to said buyer.

64. The system of claim 63, wherein said bid is a guaranteed bid.

65. The system of claim 58, wherein said means for receiving a special fare listing includes means for receiving a special fare listing that further does not specify an airline.

66. The system of claim 58, wherein said means for receiving a special fare listing includes means for receiving a special fare listing that further does not specify a parameter selected from the group consisting of a departing airport, a destination airport, a total travel time, a number of stops, and a number of plane changes.

67. A system comprising;
means for receiving a booking of an unspecified-time ticket to a specified destination location from a specified departure location within a specified time range, said unspecified-time ticket excluding a specified departure time;
means for examining a plurality of flights which would satisfy the specified terms of said unspecified-time ticket to determine which of said plurality of flights to select for said unspecified-time ticket;
means for selecting one of said plurality of flights; and
means for initiating notice of said selected flight, wherein said selected flight includes a specified departure time.

68. The system of claim 67, wherein said means for receiving a booking of an unspecified-time ticket includes receiving said booking limited to groups of two or more travelers.

69. The system of claim 67, wherein said means for receiving a booking of an unspecified-time ticket receives said booking from a central reservation system.

70. The system of claim 67, wherein said means for receiving a booking of an unspecified-time ticket receives said booking from an airline reservation system.

71. The system of claim 67, wherein said means for examining a plurality of flights includes means for examining an actual quantity of tickets booked within a fare class on each of said plurality of flights relative to a forecasted quantity of tickets booked within said fare class.

72. The system of claim 71, wherein said means for selecting a flight includes means for selecting a flight for which said forecasted quantity of tickets booked exceeds said actual quantity of tickets booked.

73. The system of claim 67, wherein said means for receiving a booking of an unspecified-time ticket includes means for receiving a booking of an unspecified-time ticket that further does not include a specified airline.

74. The system of claim 67, wherein said means for receiving a booking of an unspecified-time ticket includes means for receiving a booking of an unspecified-time ticket that further does not specify a flight parameter selected from the group consisting of a departing airport, a destination airport, a total travel time, a number of stops, and a number of plane changes.

75. The system of claim 67, further comprising:
means for analyzing route-based information for actual flights; and
means for allocating inventory to a special fare listing relating to said unspecified-time ticket at a lower fare/class than currently available on said actual flights.

76. A system comprising:
a memory device having embodied therein information relating to a plurality of flights;
a processor in communication with said memory device, said processor configured to:
create a special fare listing for air travel to a specified destination location from a specified departure location within a specified time range, said special fare listing excluding a specified departure time;
make available said special fare listing;
examine a plurality of flights which would fulfill the specified terms of a ticket relating to said special fare listing to determine which of said plurality of flights to select for said ticket, each of said plurality of flights including a specified departure time;
select one of said plurality flights; and
provide notification of flight information, including a departure time, corresponding to said selected flight.

77. The system of claim 76, wherein said processor examines said plurality of flights after booking of said ticket.

78. The system of claim 77, wherein said booking of said ticket is limited to groups of two or more travelers.

79. The system of claim 76, wherein said processor is configured to make available flight information that further does not specify a price term.

80. The system of claim 79, wherein said processor is further configured to:
receive a bid for said ticket; and
transmit an acceptance of said bid.

81. The system of claim 80, wherein said bid is a guaranteed bid.

82. The system of claim 76, wherein said processor is configured to create a special fare listing that further does not specify an airline.

83. The system of claim 76, wherein said processor is configured to create a special fare listing that further does not specify a parameter selected from the group consisting of a departing airport, a destination airport, a total travel time, a number of stops, and a number of plane changes.

84. The system of claim 76, further comprising:

means for providing a ticket without a departure time indicated thereon.

85. A system comprising:

a memory device having embodied therein information relating to a plurality of flights;

a processor in communication with said memory device, said processor configured to:

receive a special fare listing for air travel to a specified destination location from a specified departure within a specified time range, said special fare listing excluding a specified departure time;

provide said special fare listing to a buyer;

receive a booking of a ticket corresponding to said special fare listing from said buyer;

transmit said booking to an airline; and receive an identification of a flight selected by said airline which fulfills the terms of said ticket, said selected flight including a specified departure time.

86. The system of claim 85, wherein said booking of a ticket is limited in terms of availability to groups of two or more travelers.

87. The system of claim 85, wherein said buyer is a travel agent.

88. The system of claim 85, wherein said processor is configured to receive a special fare listing that further does not specify a price term.

89. The system of claim 88, wherein said processor is further configured to:

receive a bid for said ticket from said buyer; and transmit an acceptance of said bid to said buyer.

90. The system of claim 89, wherein said bid is a guaranteed bid.

91. The system of claim 85, wherein said processor is configured to receive a special fare listing that further does not specify an airline.

92. The system of claim 85, wherein said processor is configured to receive a special fare listing that further does not specify a flight parameter selected from the group consisting of a departing airport, a destination airport, a total travel time, a number of stops, and a number of plane changes.

93. A system comprising:

a memory device having embodied therein information relating to a plurality of flights;

a processor in communication with said memory device, said processor configured to:

receive a booking of an unspecified-time ticket to a specified destination location from a specified departure location within a specified time range, said unspecified-time ticket excluding a specified departure time;

examine a plurality of flights which would satisfy the specified terms of said unspecified-time ticket to determine which of said plurality of flights to select for said unspecified-time ticket;

select one of said plurality of flights; and provide notice of said selected flight, wherein said selected flight includes a specified departure time.

94. The system of claim 93, wherein said receiving a booking of an unspecified-time ticket includes receiving said booking limited to groups of two or more travelers.

95. The system of claim 93, wherein said processor is configured to receive said booking from a central reservation system.

96. The system of claim 93, wherein said processor is configured to receive said booking from an airline reservation system.

97. The system of claim 93, wherein said processor is configured to examine an actual quantity of tickets booked within a fare class on each of said plurality of flights relative to a forecasted quantity of tickets booked within said fare class.

98. The system of claim 97, wherein said processor is configured to select a flight for which said forecasted quantity of tickets booked exceeds said actual quantity of tickets booked.

99. The system of claim 93, wherein said receiving a booking of an unspecified-time ticket includes receiving a booking of an unspecified-time ticket that further does not include a specified airline.

100. The system of claim 93, wherein said processor is configured to receive a booking of an unspecified-time ticket that further does not specify a flight parameter selected from the group consisting of a departing airport, a destination airport, a total travel time, a number of stops, and a number of plane changes.

101. The system of claim 93, wherein said processor is further configured to:

analyze route-based information for actual flights; and allocate inventory to a special fare listing relating to said unspecified-time ticket at a different fare/class than currently available on said actual flights.

* * * * *